United States Patent
Shirakawa

(10) Patent No.: US 8,587,470 B2
(45) Date of Patent: Nov. 19, 2013

(54) RADAR APPARATUS AND TARGET DETECTING METHOD

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 13/038,848

(22) Filed: Mar. 2, 2011

(65) Prior Publication Data

US 2011/0215964 A1    Sep. 8, 2011

(30) Foreign Application Priority Data

Mar. 4, 2010    (JP) ................. 2010-048308

(51) Int. Cl.
*G01S 7/36*    (2006.01)

(52) U.S. Cl.
USPC ............. 342/25 R; 342/81; 342/83; 342/157

(58) Field of Classification Search
USPC ..................... 342/25, 81, 83, 157
See application file for complete search history.

(56) References Cited

U.S. PATENT DOCUMENTS

| | | | |
|---|---|---|---|
| 3,731,103 A * | 5/1973 | O'Meara | 250/203.2 |
| 6,067,048 A | 5/2000 | Yamada | |
| 6,288,672 B1 | 9/2001 | Asano et al. | |
| 7,196,656 B2 | 3/2007 | Shirakawa | |
| 2009/0079617 A1 | 3/2009 | Shirakawa et al. | |

FOREIGN PATENT DOCUMENTS

| | | |
|---|---|---|
| EP | 2045612 | 4/2009 |
| JP | 11-231040 A | 8/1999 |
| JP | 2000-155171 A | 6/2000 |
| JP | 2006-098181 A | 4/2006 |
| JP | 2007-155381 A | 6/2007 |
| JP | 2007-199085 A | 8/2007 |

OTHER PUBLICATIONS

European Search Report mailed Jun. 27, 2011 for corresponding European Application No. EP 11 15 6963.

* cited by examiner

*Primary Examiner* — Timothy A Brainard
(74) *Attorney, Agent, or Firm* — Fujitsu Patent Center

(57) ABSTRACT

Provided is a radar apparatus including an envelope detector unit that acquires an envelope component of a signal transmitted from a receiving antenna in at least one combination of a plurality of combinations of transmitting antennas and receiving antennas whose spatial phases become equal to each other in the array antenna; a determination unit that determines an amount of compensation in the at least one combination based on the envelope component acquired by the envelope detector unit; and a compensator unit that compensates a phase of a signal transmitted from each of the receiving antennas before aperture synthesis by using the amount of compensation determined by the determination unit, or compensates a phase of a signal radiated from the transmitting antenna in another combination.

7 Claims, 20 Drawing Sheets

FIG. 13
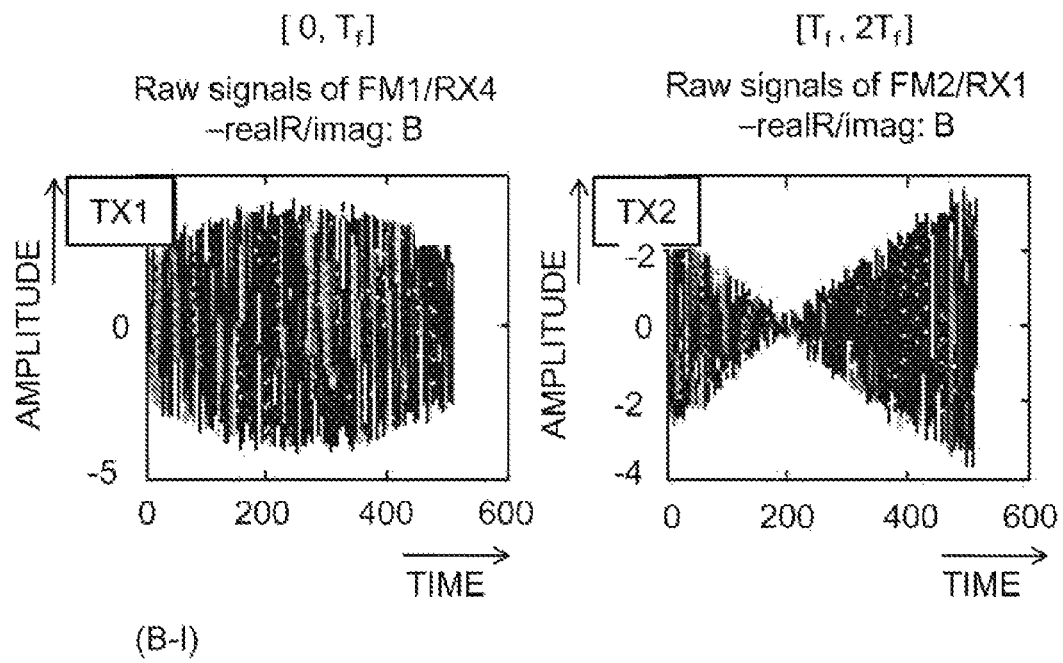
(B-l)
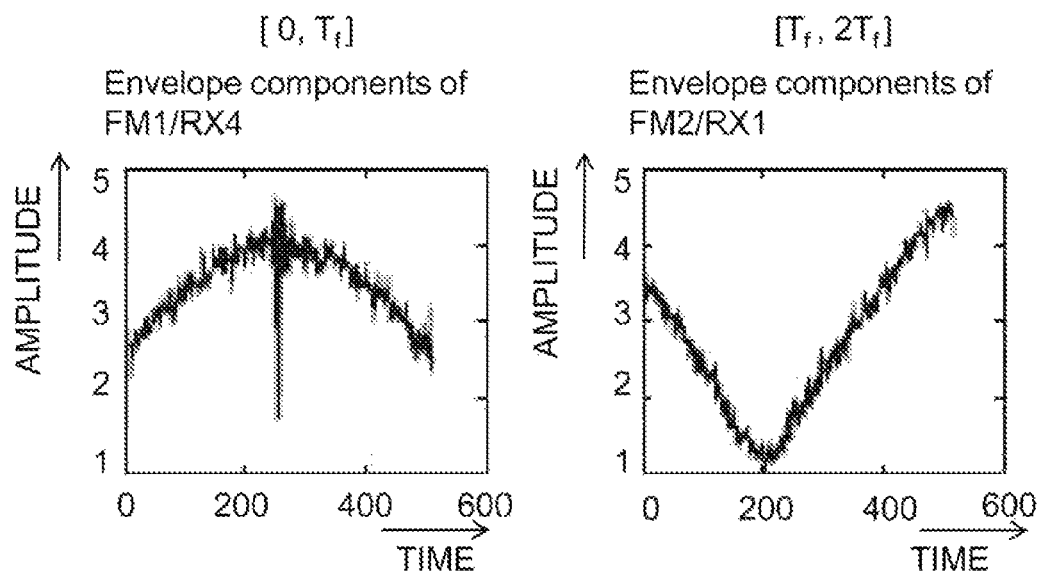

RADAR APPARATUS AND TARGET DETECTING METHOD

CROSS-REFERENCE TO RELATED APPLICATION

This application is based upon and claims the benefit of priority of the prior Japanese Patent Application No. 2010-048308, filed on Mar. 4, 2010, the entire contents of which are incorporated herein by reference.

FIELD

The present invention relates to a detection and ranging apparatus and a target detecting method each using aperture synthesis.

BACKGROUND

As the detection and ranging apparatus, for example, an in-vehicle radar (hereinafter, a radar apparatus is taken as a specific example of the detection and ranging apparatus), there is an apparatus in which a technology is adopted in which a transmission sensor array including a plurality of transmission sensor elements is combined with a reception sensor'array including a plurality of reception sensor elements to effectively enlarge an aperture of the reception sensor array, thereby realizing a downsized apparatus without sacrificing the performance. This technology is called "holographic aperture synthesis system", "holograph", "aperture synthesis", and so on. The radar apparatus using the aperture synthesis radiates probe signals from the plurality of transmission sensor elements (by any one or a combination of a time-division multiplexing system, a frequency division multiplexing system, and a code division multiplexing system). The radar apparatus then receives, by the plurality of reception sensor elements, echo signals generated, by reflecting the probe signals by a target to be detected. The radar apparatus then synthesizes the signals received by the respective reception sensor elements to increase the number of effective reception sensor elements, thereby increasing the number of detectable targets, and also improving an angular resolution capability. In the following description, the radar apparatus using the aperture synthesis is referred to as "synthesis aperture radar". Further, the sensor elements are used without any distinction from antennas (elements), and the sensor array is used without any distinction from an array antenna.

RELATED ART DOCUMENTS

[Patent document 1] Japanese Laid-open Patent Publication No. 2000-155171
[Patent document 2] Japanese Laid-open Patent Publication No. 2006-98181
[Patent document 3] Japanese Laid-open Patent Publication No. 2007-155381
[Patent document 4] Japanese Laid-open Patent Publication No. 11-231040

However, the conventional synthetic aperture radar has such a problem that the target to be detected cannot be precisely detected under a certain condition. As such a condition, for example, there is a case in which a plurality of objects exist at substantially the same relative distances in the line of sight from the radar (hereinafter, referred to simply as "distances"), and the respective objects move at substantially the same relative velocities in the same line of sight (hereinafter, referred to simply as "velocities").

When such a case is considered in detail, there is a possibility that the targets cannot be detected with precision even in a scene that routinely frequently occurs such as a traffic jam (the plurality of objects move at close positions with a small velocity difference). The synthetic aperture radar as the in-vehicle radar suffers from such a problem.

SUMMARY

In the respective aspects of the present invention, in order to solve the above-mentioned problem, the following configurations are adopted.

A first aspect of the invention may relate to a radar apparatus that detects a target by aperture synthesis of signals obtained from receiving antennas in an array antenna having a plurality of antenna elements, each of which is used as at least one of transmitting antennas and receiving antennas. The radar apparatus according to the first aspect of the invention includes: an envelope detector unit that acquires an envelope component of a signal obtained from a receiving antenna in at least one combination of a plurality of combinations of transmitting antennas and receiving antennas whose spatial phases become equal to each other in the array antenna; a determination unit that determines an amount of compensation in the at least one combination based on the envelope component acquired by the envelope detector unit; and a compensator unit that compensates a phase of a signal obtained from each of the receiving antennas before aperture synthesis, or compensates a phase of a signal radiated from the transmitting antenna in another combination.

As other aspects, there may be provided a target detecting method for realizing any one of the above-mentioned configurations, a program for realizing such a method, or a computer readable storage medium storing such a program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 13 is graphs illustrating together a demodulated signal in a reference receiving antenna, and an envelope signal (envelope component) obtained by subjecting the demodulated signal to envelope detection;

DESCRIPTION OF EMBODIMENTS

Hereinafter, as one embodiment, a radar apparatus (hereinafter, referred to simply as "radar apparatus") using a frequency modulated continuous wave (FMCW) as a probe signal is described with reference to a specific example. The radar apparatus according to this embodiment is, for example, mounted on a vehicle. However, an apparatus or system on which the radar apparatus is mounted is not limited to the radar apparatus according to this embodiment. Respective embodiments described below are exemplifications, and the present invention is not limited to configurations of the respective embodiments described below.

[First Embodiment]

Hereinafter, a radar apparatus according to a first embodiment is described.

[Apparatus Configuration]

Figure 1:
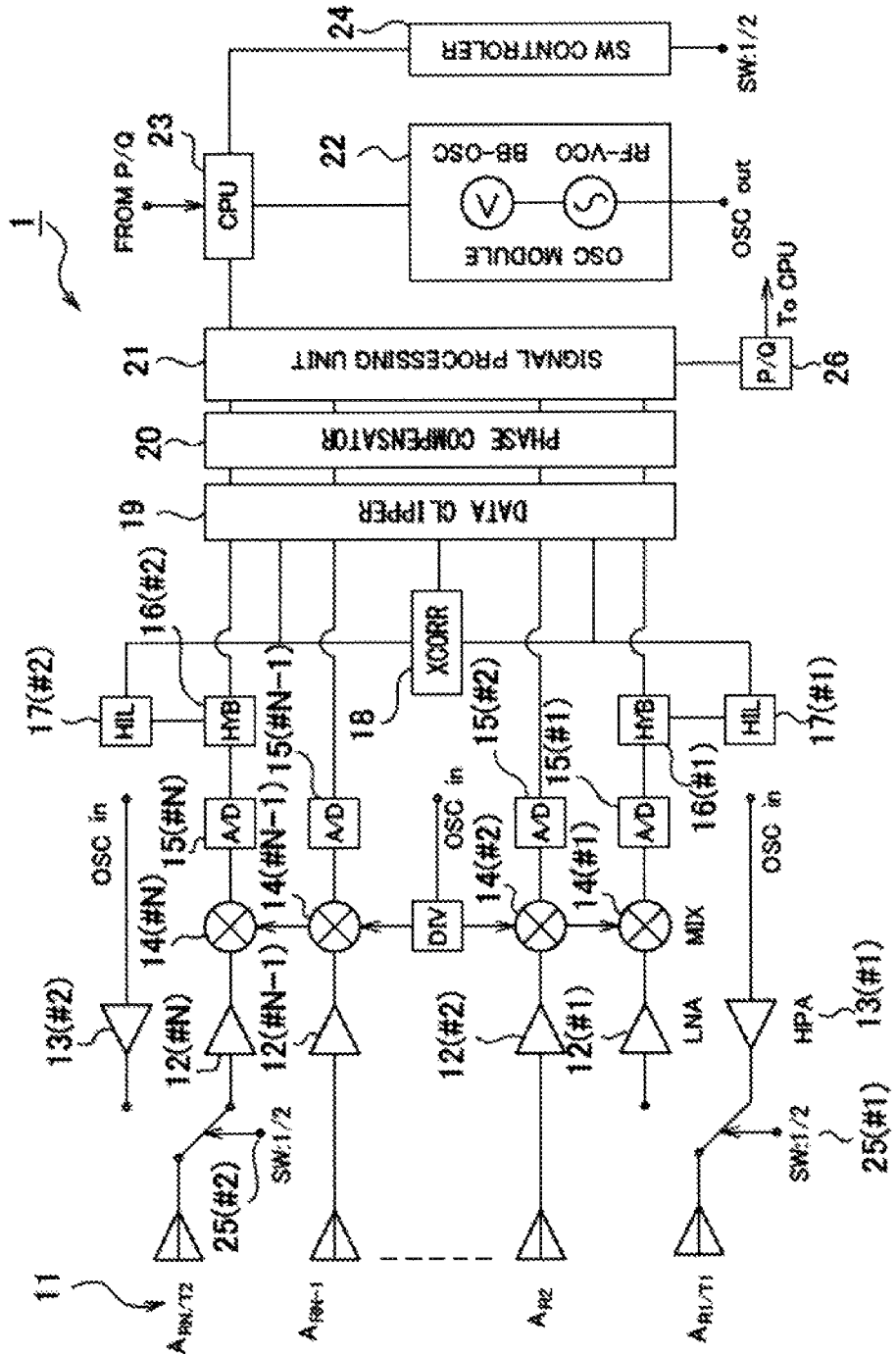
FIG. 1 is a block diagram illustrating a configuration of a radar apparatus according to a first embodiment.

FIG. 1 is a block diagram illustrating a configuration of the radar apparatus according to the first embodiment. The radar apparatus according to the first embodiment includes, as illustrated in FIG. 1, an array antenna 11, low-noise amplifiers (hereinafter, referred to as "LNAs") 12, power amplifiers (hereinafter, referred to as "HPAs") 13, mixers (MIX illustrated in FIG. 1) 14, analog-digital (hereinafter, referred to as "A/D") converters 15 (which may be configured to mount a memory that temporarily stores digital data therein), branching units (hereinafter, referred to as "HYBs") 16, envelope detector units (HIL illustrated in FIG. 1) 17, a cross-correlation calculator (XCORR illustrated in FIG. 1) 18, a data clipper 19, a phase compensator 20, a signal processing unit 21, an oscillation module 22, a central processing unit (CPU) 23, a switch controller 24, switches 25, and a transmission cycle setting unit (P/Q illustrated in FIG. 1) 26. Those respective units are realized by components of software, components of hardware, or a combination thereof (refer to the [Others] section).

The oscillation module 22 may be so configured as to digitally directly generate an FMCW signal, such as a direct digital synthesizer (DDS). In a specific example, it is assumed that the oscillation module 22 has a general analog circuit configuration, that is, a combination of a baseband oscillator (BB-OSC illustrated in FIG. 1) and a radio-frequency voltage-controlled oscillator (RF-VCO illustrated in FIG. 1, which may also be a current-controlled oscillator). In the oscillation module 22, a reference signal output from the baseband oscillator is transmitted to the radio-frequency voltage-controlled oscillator, and a system reference signal modulated in frequency by using the reference signal is output from the radio-frequency voltage-controlled oscillator. For example, a triangular wave is used as the reference signal.

Each HPA 13 is disposed in a processing system corresponding to each transmitting antenna. In an example of FIG. 1, because two antennas $A_{T1}$ and $A_{T2}$ are used as the transmitting antennas, two HPAs 13 (HPA13 (#1) and HPA 13 (#2)) are disposed. The HPAs 13 amplify the system reference signal output from the oscillation module 22, and output the amplified signal from the antenna selected as the transmitting antenna as a target detection probe signal.

The array antenna 11 has N antenna (sensor) elements which are arranged at respective different spatial positions. For example, the array antenna 11 forms a uniform linear array antenna (ULA antenna) in which the respective antenna elements are linearly arranged at regular intervals. In the first embodiment, two antenna elements located on both ends of the respective antenna elements that are linearly arranged are shared both for transmission and reception, and the other antenna elements are used only for the reception. In the following description, the antenna element shared both for transmission and reception is represented as a shared antenna $A_{R1/T1}$ or a shared antenna $A_{RN/T2}$.

As a specific example for describing the present invention, for simplification of grasping the concept, the shared antennas are configured to switch between transmission and reception in time division by the switch 25. The antenna elements that operate as receiving antennas are represented by $A_{R1}$ to $A_{RN}$, and the antenna elements that operate as the transmitting antennas are represented by $A_{T1}$ and $A_{T2}$. Thus, in the radar apparatus according to the first embodiment, an aperture enlarging technique is employed in which a plurality of transmitting antennas and a plurality of receiving antennas operate in a coordinated manner to increase the number of effective receiving antennas.

The switch 25 switches the shared antenna to the transmitting antenna or the receiving antenna according to a control signal from the switch controller 24. More specifically, the switch 25(#1) selectively connects the shared antenna $A_{R1/T1}$ to the HPA 13(#1) or the LNA 12(#1). With connection to the HPA 13(#1), the shared antenna $A_{R1/T1}$ operates as the transmitting antenna $A_{T1}$, and with connection to the LNA 12 (#1), the shared antenna $A_{R1/T1}$ operates as the receiving antenna $A_{R1}$. Likewise, the switch 25(#2) selectively connects the shared antenna $A_{RN/T2}$ to the HPA 13(#2) or the LNA 12(#N). With connection to the HPA 13(#2), the shared antenna $A_{RN/T2}$ operates as the transmitting antenna $A_{T2}$, and with connection to the LNA 12(#N), the shared antenna $A_{RN/T2}$ operates as the receiving antenna $A_{RN}$.

The switch controller 24 controls a switching timing of the switch 25 according to transmission cycle information transmitted from the CPU 23 and a cycle $T_f$ of the reference signal output from the baseband oscillator of the oscillation module 22.

The transmission cycle setting unit 26 transmits an instruction for changing the cycle $T_f$ of the reference signal or the transmission cycle information (P/Q) to the CPU 23 according to a request from the signal processing unit 21. The transmission cycle information (P/Q) indicates a ratio (P) of time slots using the transmitting antenna $A_{T1}$ and a ratio (Q) of time slots using the transmitting antenna $A_{T2}$, with the cycle $T_f$ of the reference signal as one unit (duty ratio when the respective shared antennas are switched for purpose of transmission or reception in one time slot is ignored).

During $PT_f(=P\times T_f)$, the switch controller 24 uses the shared antenna $A_{RN/T2}$ as the receiving antenna $A_{RN}$, and uses the shared antenna $A_{R1/T1}$ as the transmitting antenna $A_{T1}$ and the receiving antenna $A_{R1}$ while switching in a given cycle. Subsequently, during $QT_f(=Q\times T_f)$, the switch controller 24 uses the shared antenna $A_{R1/T1}$ as the receiving antenna $A_{R1}$, and uses the shared antenna $A_{RN/T2}$ as the transmitting antenna $A_{T2}$ and the receiving antenna $A_{RN}$ while switching in the given cycle.

Figure 2:
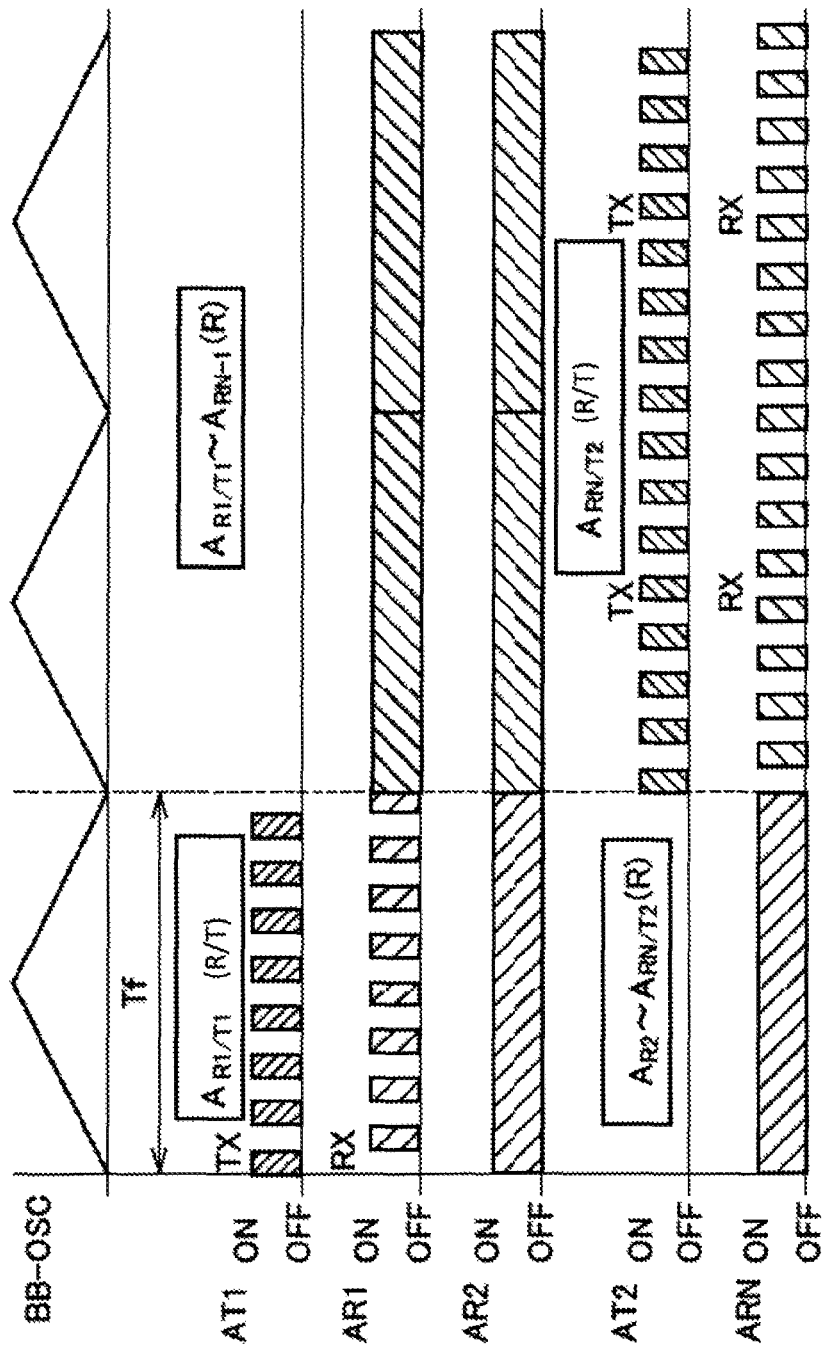
FIG. 2 is a timing chart illustrating a transmission/reception timing when transmission cycle information (P=1, Q=2) is used.

FIG. 2 is a timing chart illustrating a transmission/reception timing when the transmission cycle information (P=1, Q=2) is used. According to an example of FIG. 2, during [0, $T_f$], the transmitting antenna $A_{T1}$ radiates probe signals in a given cycle, and the receiving antenna $A_{RN}$ continuously receives an echo signal. During [$T_f$, $3T_f$], the transmitting antenna $A_{T2}$ radiates the probe signals in a given cycle, and the receiving antenna $A_{R1}$ continuously receives the echo signal. Referring to this timing chart, when "one cycle of the operation as an apparatus" according to this embodiment is represented with a measurement start time being 0, in a time slot [0, $PT_f$], $A_{R1/T1}$ is operated as the shared antenna, and $A_{R2}$ to $A_{RN}$ are operated as the receiving antennas. In a succeeding time slot [$PT_f$, $(P+Q)T_f$], $A_{RN/T2}$ is operated as the shared antenna, and $A_{R1}$ to $A_{RN-1}$ are operated as the receiving antennas.

Each LNA 12 is disposed in a processing system corresponding to each receiving antenna. In the example of FIG. 1, an LNA 12(#2) to an LNA 12 (#N−1) are always connected to the receiving antennas $A_{R2}$ to $A_{RN-1}$, respectively. The LNA 12(#1) is connected to the receiving antenna $A_{R1}$ by switching the switch 25(#1). The LNA 12(#N) is connected to the receiving antenna $A_{RN}$ by switching the switch 25 (#2). The LNA 12 receives a reception signal from the connected receiving antenna, and amplifies the reception signal. The amplified signal is transmitted to the mixers 14.

Each mixer 14 is connected to the LNA 12. The mixer 14 mixes the signal amplified by each LNA 12 with the system reference signal transmitted from the oscillation module 22 to convert a radio-frequency echo signal into a baseband signal.

Each A/D converter 15 converts the baseband signal output from the mixer 14 into a digital baseband signal at a given sampling frequency. Hereinafter, the digital baseband signal is simply referred to as "demodulated signal".

The HYBs 16 are disposed in the respective processing systems corresponding to the receiving antennas $A_{R1}$ and $A_{RN}$ in order to process the demodulated signals of the signals received by the receiving antennas $A_{R1}$ and $A_{RN}$. More specifically, the HYB 16(#1) is connected to the A/D converter 15(#1), and the HYB 16(#2) is connected to the A/D converter 15(#N). In other words, each HYB 16 is disposed in a processing system that processes a signal received by a receiving antenna of a combination of a transmitting antenna and the receiving antenna whose spatial phases become equal to each other in the array antenna 11 (accordingly, there is no need to limit a portion where the HYB and the HIL are mounted to the receiving antennas on the outermost edges of the array antenna). The aperture synthesizing operation is executed on the basis of the signal received by the combination of the transmitting antenna and the receiving antenna which gives the equal spatial phase as described above. In the following description, the combination of the transmitting antenna and the receiving antenna employed based on the aperture synthesis as described above is referred to as "reference combination", and the transmitting antenna and the receiving antenna in the reference combination are referred to as "reference transmitting antenna" and "reference receiving antenna", respectively. In the first embodiment, the combination of the reference transmitting antenna $A_{T1}$ and the reference receiving antenna $A_{RN}$, and the combination of the reference transmitting antenna $A_{T2}$ and the reference receiving antenna $A_{R1}$ are the reference combinations (as other specific reference combinations, a combination of the reference transmitting antenna $A_{T1}$ and the reference receiving antenna $A_{R1}$, and a combination of the reference transmitting antenna $A_{T2}$ and the reference receiving antenna $A_{RN}$ are conceivable. In this case, a reference phase length is zero).

Figure 3:
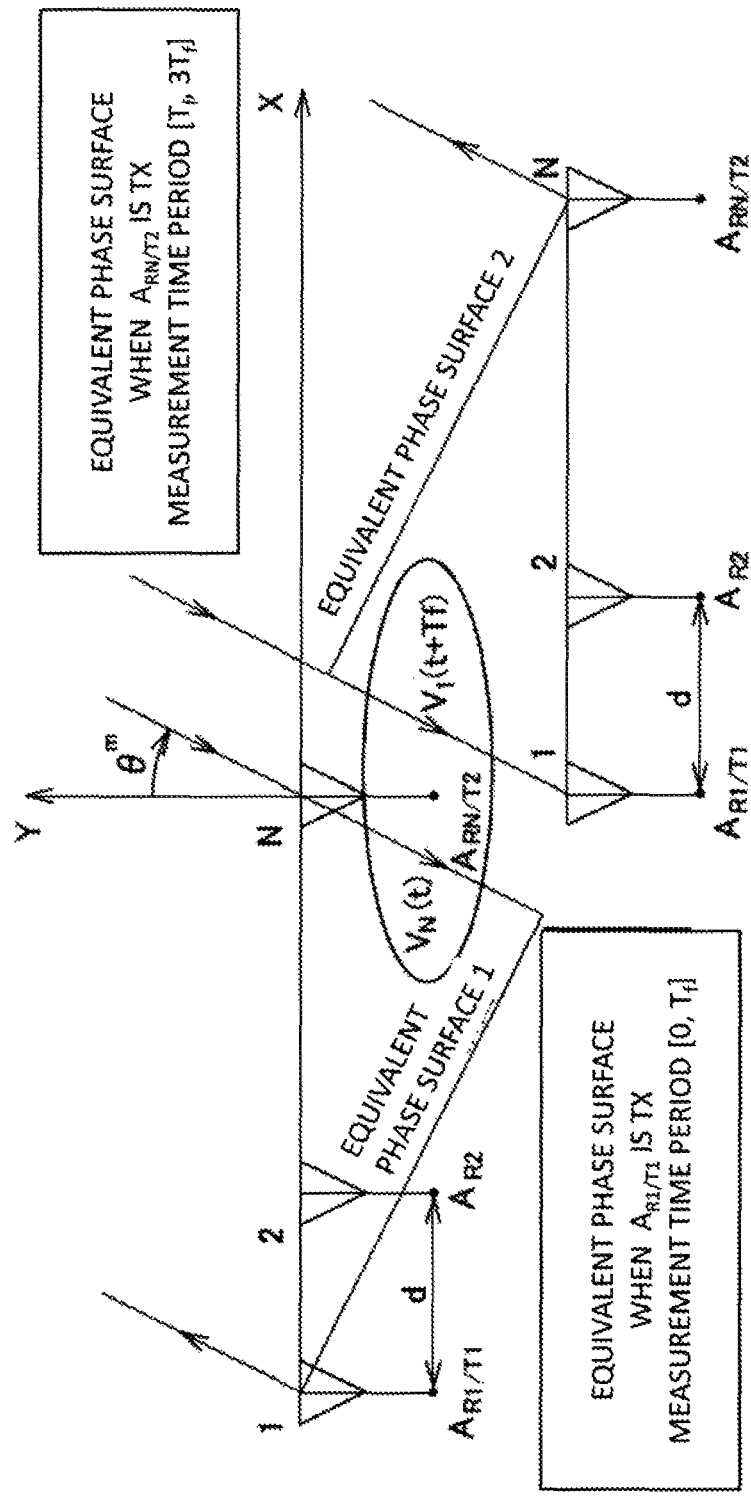
FIG. 3 is a conceptual diagram illustrating a condition for satisfying aperture synthesis. In the following description; time slots in which $A_{R1/T1}$ and $A_{RN/T2}$ are operated as duplexer antenna elements (in the timing chart of FIG. 2, observation time periods: $[0, T_f]$ and $[T_f, 3T_f]$) are FM1 and FM2, or measurement time periods A and B, respectively.

FIG. 3 is a conceptual diagram illustrating conditions for satisfying the aperture synthesis in an example in which the device operates according to the timing chart of FIG. 2. FIG. 3 illustrates an appearance in which a probe signal is radiated from the reference transmitting antenna $A_n$ and an echo signal thereof is received by the reference receiving antenna $A_{RN}$ in the time slot [0, $T_f$] (hereinafter, also referred to as "measurement time period A"). Further, FIG. 3 also illustrates an appearance in which the probe signal is radiated from the reference transmitting antenna $A_{T2}$ and an echo signal thereof is received by the reference receiving antenna $A_{R1}$ in the time slot [$T_f$, $3T_f$] (hereinafter, also referred to as "measurement time period B"). As is apparent from this drawing, the aperture synthesis is established for the respective signals received in the respective measurement time periods A and B when the phase length of the signal received by the reference receiving antenna $A_{RN}$ in the measurement time period A matches the phase length of the signal received by the reference receiving antenna $A_{R1}$ in the measurement time period B.

Each HYB 16 branches the demodulated signal output from the A/D converter 15 in a direction of the envelope detector unit 17 and in a direction of the data clipper 19.

The envelope detector units 17 are connected to the respective HYBs 16 in order to process the demodulated signals of the signals received by the reference receiving antennas. The envelope detector units 17 detect envelope components of the signals branched by the HYBs 16. In the following description, the envelope components acquired by the envelope detector units 17 may be referred to as "envelope signals". When the envelope detector units 17 detect, for example, the existence of a signal component having a cycle longer (a frequency lower) than the minimum frequency resolution of Fourier transformation (such as fast Fourier transformation (FFT)) conducted by the signal processing unit 21, the envelope detector units 17 transmit the acquired envelope signal to the cross-correlation calculator 18. When the envelope detector units 17 detect the existence of the envelope component having the cycle longer than the minimum frequency resolution of the Fourier transformation, the envelope detector units 17 may ask the transmission cycle setting unit 26 to request the probe signal radiation in accordance with the above-mentioned transmit cycle information (P and Q) to the CPU 23 (including a change in the values of P, Q, and $T_f$). The envelope detector units 17 are realized by using, for example, a diode detector, a quadrature demodulator, a Hilbert transformer, a wavelet transformer, or a filter bank.

Figure 4:
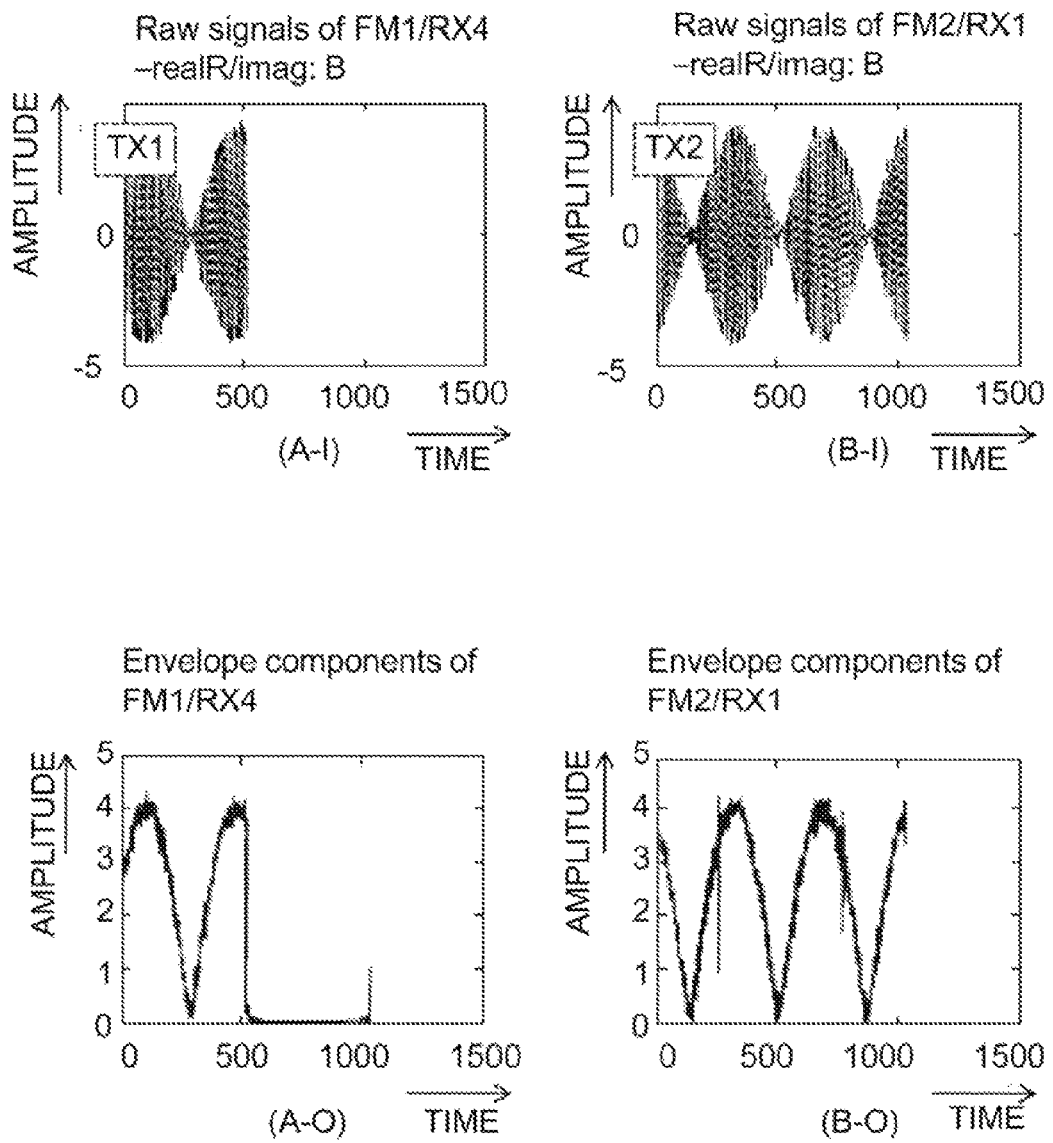
FIG. 4 is a diagram illustrating an input signal to an envelope detection unit and an envelope signal output from the envelope detection unit.

FIG. 4 is a diagram illustrating an input signal to the envelope detector unit and an envelope signal output from the envelope detector unit. FIG. 4 illustrates a case using the timing chart of FIG. 2, in which two targets to be detected are set, various factors (distance, angle, and velocity) of the respective targets to be detected are set to $T^1$ (40 meters (m), 0 degrees (deg), and 10 kilometers per hour (km/h) and $T^2$ (40 (m), 3 (deg), and 12.5 (km/h), and a signal-to-noise ratio (SNR) is set to 30 decibel (dB).

In FIG. 4, graphs (A-I) and (B-I) illustrated at an upper stage represent the signals input to the envelope detector units 17, and graphs (A-O) and (B-O) illustrated at a lower stage represent the signals output from the envelope detector units 17. Of those graphs, the graphs (A-I) and (A-O) illustrate the demodulated signal obtained during $[0, T_f]$ in the example of FIG. 2, and the results of signal processing to which the demodulated signal is subjected. The graphs (B-I) and (B-O) illustrate the demodulated signal obtained during $[T_f, 3T_f]$ in the example of FIG. 2, and the results of signal processing to which the demodulated signal is subjected.

The cross-correlation calculator 18 takes a cross correlation between the envelope signal related to the signal received by the reference receiving antenna $A_{RN}$ corresponding to the reference transmitting antenna $A_{T1}$, and the envelope signal related to the signal received by the reference receiving antenna $A_{R1}$ corresponding to the reference transmitting antenna $A_{T2}$. In taking the cross correlation, the cross-correlation calculator 18 retains the envelope signal processed in the measurement time period $[0, T_f]$ in a memory (not shown), and detects, as a time lag, a timing at which a phase of the envelope signal processed in a subsequent measurement time period $[T_f, 3T_f]$ matches a phase of the previous envelope signal. In taking the cross correlation, the cross-correlation calculator 18 subjects a no-signal interval of the envelope signal acquired in the measurement time period $[0, T_f]$, which is short in signal length, to zero padding, in order to conform the lengths of both the envelope signals to each other. The time lengths occupied by the respective envelope signals are values determined by the transmit cycle information (P/Q illustrated in FIG. 1) transmitted from the CPU. Although not particularly specified in the following description, a "time" in the graph having a time axis represents not the measurement time period per se, but an index as data. Accordingly, a count starts from zero irrelevant to a difference from a real measurement time period.

Figure 5:
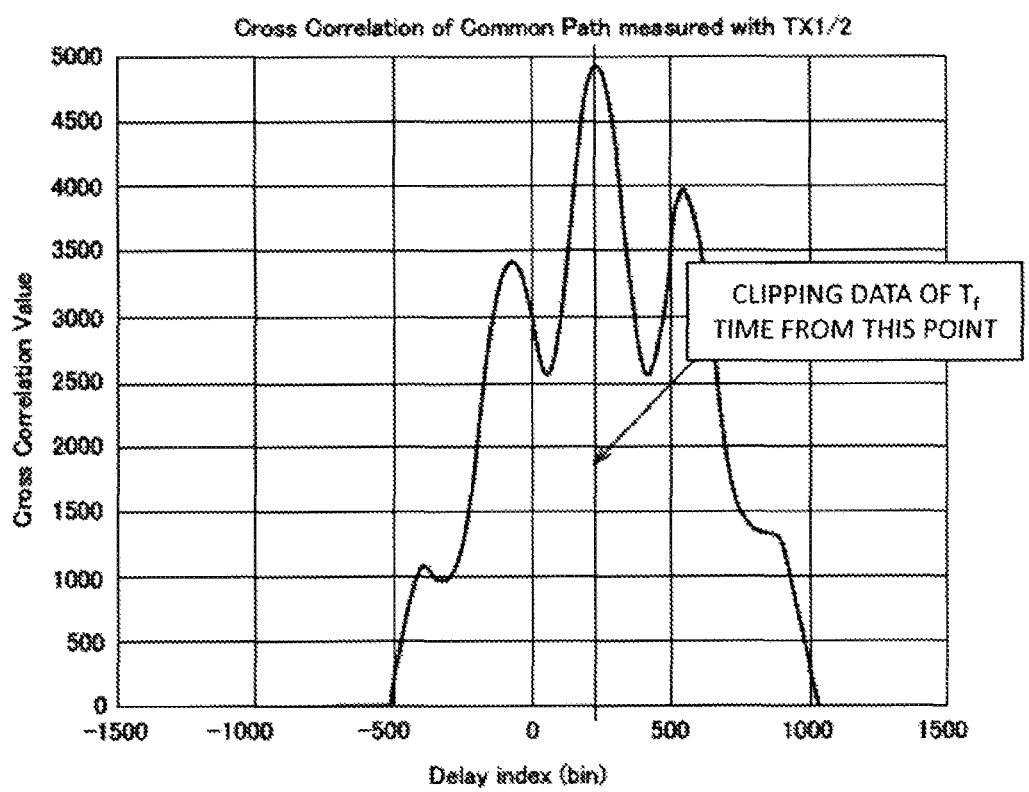
FIG. 5 is a graph illustrating cross-correlation values between respective envelope signals illustrated in FIG. 4.

FIG. 5 is a graph illustrating a cross-correlation value between the respective envelope signals illustrated in FIG. 4. In an example of FIG. 5, in a delay index close to 240, a correlation value becomes the maximum. Therefore, the cross-correlation calculator 18 determines the time lag as 240. This is also illustrated in FIG. 4. Specifically, a phase of a waveform after the time index 240 in the graph (B-O) of FIG. 4 matches a phase of a waveform of a (valid) signal portion in the graph (A-O) of FIG. 4.

When detecting the time lag between the envelope components of the demodulated signals of the reference combination as described above, the cross-correlation calculator 18 transmits the time lag to the data clipper 19. When a clear peak is not obtained in the cross correlation, that is, when a peak value of the cross correlation is lower than a given threshold value, or when several peaks having the almost same amplitude appear, the cross-correlation calculator 18 may request the transmission cycle setting unit 26 to instruct a change in the cycle $T_f$ of the reference signal or the transmit cycle information (P/Q).

The data clipper 19 receives the demodulated signals of the signals received by the respective receiving antennas in the respective time slots from the respective A/D converters 15, and retains the respective demodulated signals in a memory (that is, the memory may save the output from the A/D converter 15 obtained in the above-mentioned "one cycle of the operation as a device" in an accessible manner for each time slot and each receiving system (antennas to A/D converters). Further, in the respective operations which are described later, data from a desired receiving system in a desired time slot may be appropriately output). The data clipper 19 conforms the phases of the envelope components of the respective input demodulated signals to each other based on the time lag transmitted from the cross-correlation calculator 18. More specifically, the data clipper 19 clips signals for a $T_f$ time after the time lag from the respective demodulated signals during $[T_f, 3T_f]$. As a result, the data clipper 19 may acquire data that matches the respective demodulated signals during $[0, T_f]$ in phase of the envelopes, from the respective demodulated signals during $[T_f, 3T_f]$ (that is, a data string in which the phases of the envelopes are conformed to each other from data strings acquired in different time slots). The data clipper 19 transmits the respective demodulated signals thus compensated in phase to the phase compensator 20.

Figure 6:
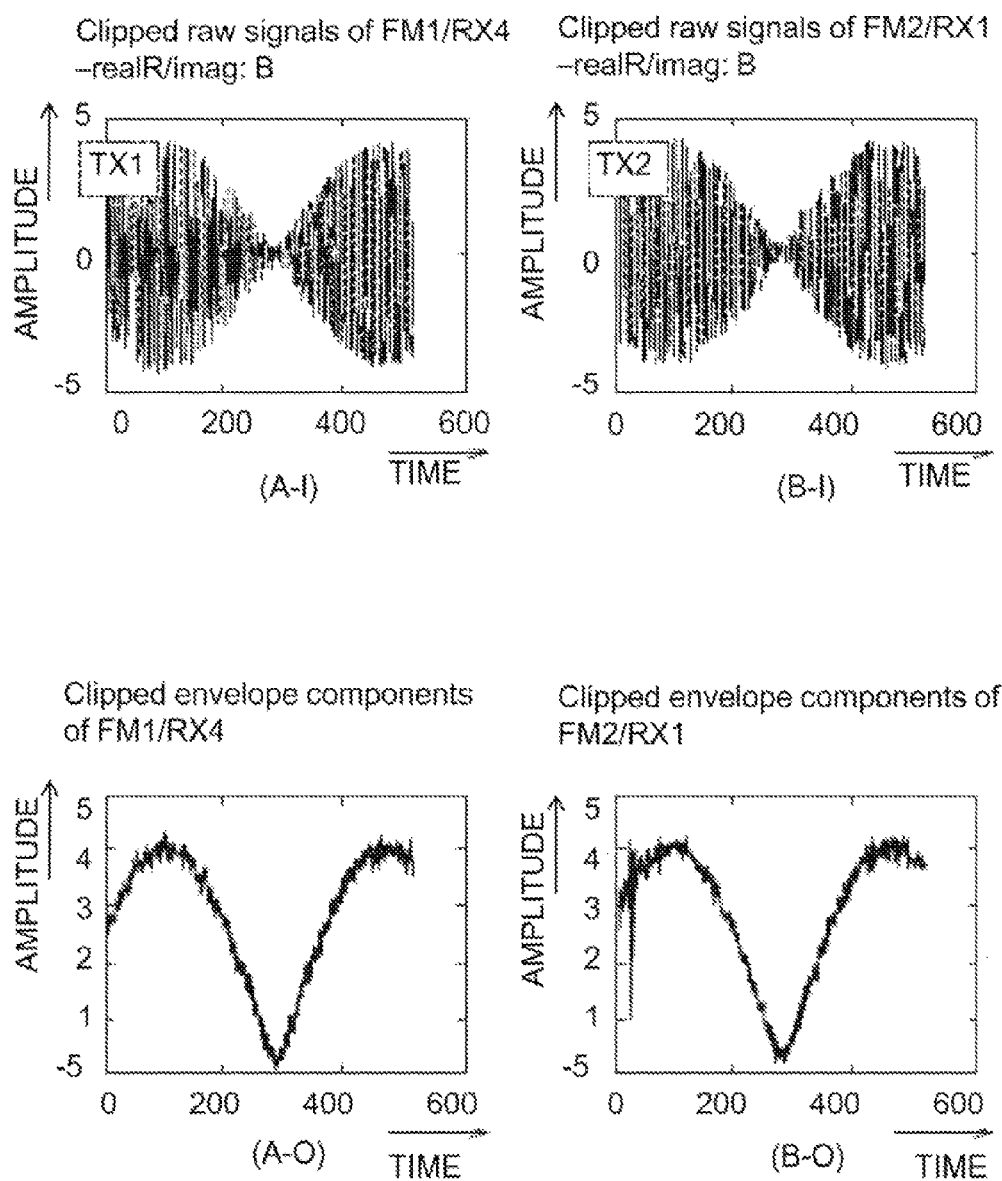
FIG. 6 is graphs illustrating results of phase compensation of envelope components.

FIG. 6 is graphs illustrating the results of phase compensation of the envelope components. As is apparent from a comparison with FIG. 4, the envelopes of the respective signals (derived from the reference receiving antenna) clipped by the data clipper 19 ((B-O) of FIG. 6) match the envelopes of the demodulated signals during $[0, T_f]$ ((A-O) of FIG. 6) in phase.

The phase compensator 20 receives the respective demodulated signals in which the phases of the envelope components match each other, which are transmitted from the data clipper 19 (in a specific example used herein, a length of data transmitted from the data clipper is the same as that of the time slot $[0, T_f]$), and compensates a residual phase error of the respective demodulated signals. More specifically, in order to cancel an influence of the residual phase error included in a baseband signal including characteristic variations of the respective circuit elements, the phase compensator 20 calculates an amount of compensation (in a time domain) by using Expression (2.4) that is described later, and, according to the amount of compensation, compensates the phase errors of the respective demodulated signals in the measurement time period $[T_f, 3T_f]$, which are clipped so that the phases of the envelopes match each other by the data clipper, so as to conform to the phase errors of the respective demodulated signals in another measurement time period $[0, T_f]$ (in a case of data where the phases of the envelopes match each other, data of the time domain may be converted into data of the frequency domain by FFT, and the amount of compensation may be calculated through Expression (1.13) so that the above-mentioned compensating process is implemented in the frequency domain). The respective signals thus compensated in the residual phase errors are transmitted to the signal processing unit 21.

The signal processing unit 21 subjects the respective signals transmitted from the phase compensator 20 to aperture synthesis, and applies, to the signals that have been subjected to aperture synthesis, a known angle estimation algorithm (hereinafter, referred to simply as "angle measurement algorithm") such as a digital beam forming (DBF) method, a multiple signal classification (MUSIC) method, or a propagator method based on an improved spatial-smoothing matrix (PRISM) method. Alternatively, the signals that have been subjected to aperture synthesis in the time domain may be converted into signals of the frequency domain by Fourier transformation (such as fast Fourier transformation (FFT)), and the angle measurement algorithm may be applied to the signals of the frequency domains. The aperture synthesizing method and the angle measurement algorithm may be conducted by using a known technique, and therefore their description is omitted. The signal processing unit 21 may use a correlation matrix which does not include a self-correlation component in the angle measurement algorithm.

Further, the signal processing unit 21 may acquire, from the envelope detector units 17, information on frequencies of the envelopes per se or information on the respective frequencies of the signal components that configure the envelopes, and acquire the envelope components (or above-mentioned respective amounts) through a given method. In this case, the signal processing unit 21 may give an instruction to change the cycle $T_f$ of the reference signal from the transmission cycle setting unit 26 when the frequency component (or above-mentioned respective amounts) is smaller than a given threshold value.

[Operation and Effects of the First Embodiment]

Hereinafter, operation and effects of the radar apparatus 1 according to the above-mentioned first embodiment are described.

Figure 7:
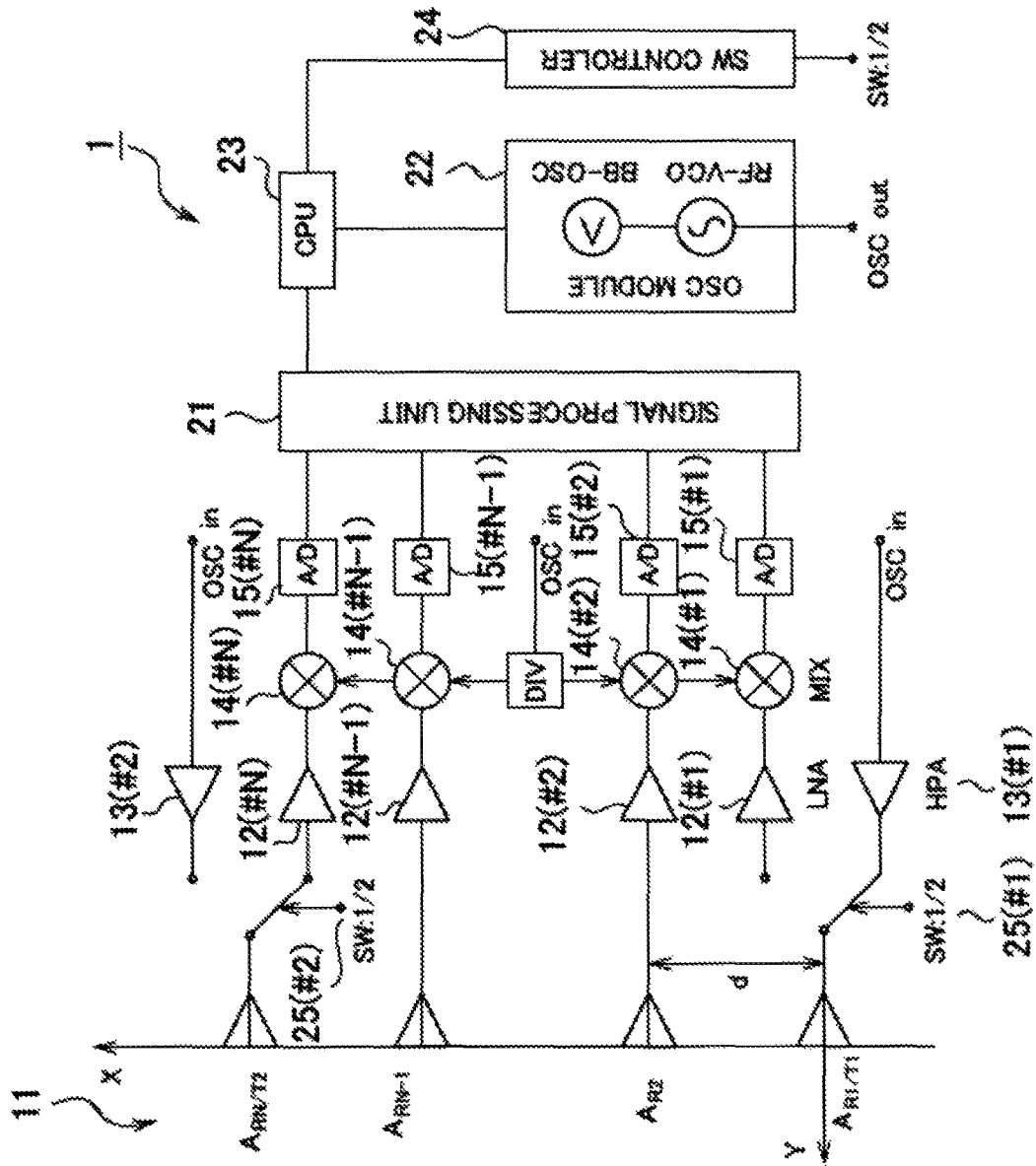
FIG. 7 is a block diagram illustrating a configuration of a radar apparatus different from that of the first embodiment.
Figure 8:
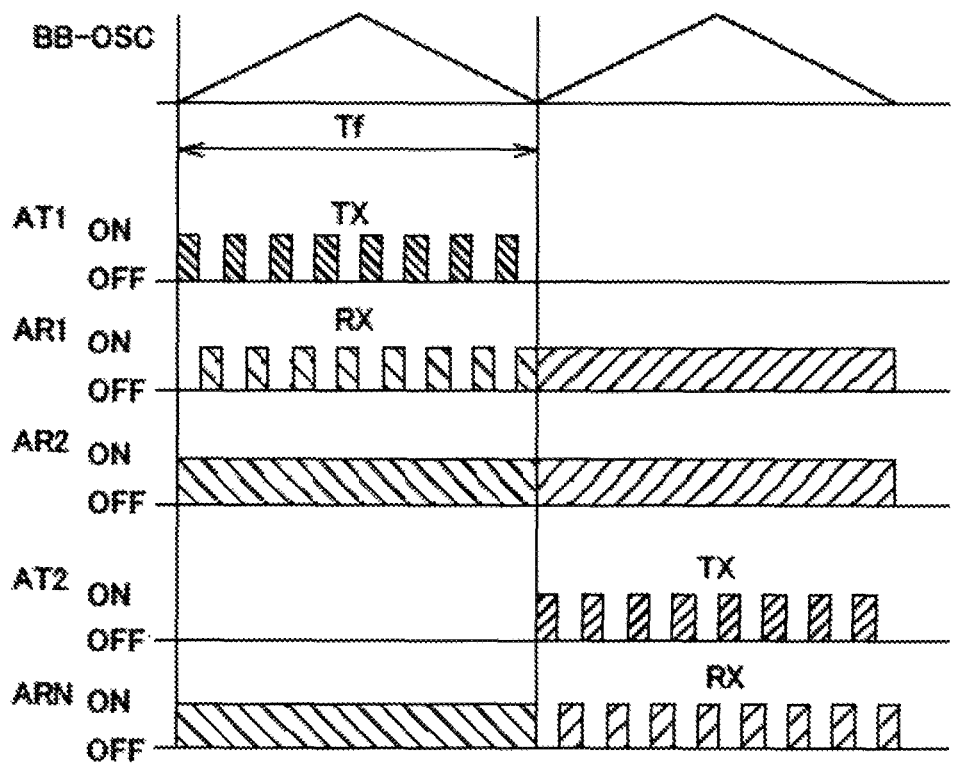
FIG. 8 is a timing chart used in the radar apparatus of FIG. 7.

First, before describing the action and effects of the first embodiment, the operation and problems of a radar apparatus different from that of the first embodiment are examined through mathematical expressions. The following description employs an example using a configuration illustrated in FIG. 7 and a timing chart illustrated in FIG. 8. FIG. 7 is a block diagram illustrating the configuration of the radar apparatus different from that of the first embodiment. FIG. 8 illustrates the timing chart used in the radar apparatus of FIG. 7. The examination using the following mathematical expressions is newly disclosed herein. Further, a cycle of the reference signal is referred to as "$T_f$" as in the above-mentioned first embodiment.

According to the transmit cycle information of FIG. 8, in the measurement time period [0, $T_f$], the shared antenna $A_{R1/T1}$ is used as the transmitting antenna or the receiving antenna, and the receiving antennas $A_{R2}$ to $A_{RN-1}$ and the shared antenna $A_{RN/T2}$ are used as the receiving antennas. Further, in the measurement time period [$T_f$, $2T_f$], the shared antenna $A_{RN/T2}$ is used as the transmitting antenna or the receiving antenna, and the receiving antennas $A_{R2}$ to $A_{RN-1}$ and the shared antenna $A_{R1/T1}$ are used as the receiving antennas.

In this example, when it is assumed that the probe signals in the respective time intervals, that is, the probe signals radiated from the transmitting antennas $A_{T1}$ and $A_{T2}$ are $v^{TX1}(t)$ and $v^{TX2}(t)$, respectively, the respective probe signals are represented by the respective following Expressions (1.1a) and (1.1b). $\omega c$ represents a carrier angular frequency of the RF-VCO that configures the oscillation module 22. Further, $\Delta\psi$ of $v^{TX2}(t)$ represents a phase shift due to a transmission time lag. In the following description, the angular frequency and the frequency are not distinguished from each other.

[Ex. 1]

$$v^{TX1}(t) = \exp\{j[\omega_c t + h(t)]\} \quad (1.1a)$$

$$v^{TX2}(t) = v^{TX1}(t + T_f) = \exp\{j[\omega_c t + h(t) + \Delta\psi]\} \quad (1.1b)$$

$$h(t) = \int_{-\infty}^{t} f(x)\,dx \quad (1.2)$$

In the above-mentioned Expressions (1.1a) and (1.1b), h(t) is defined by the above-mentioned Expression (1.2) with respect to a reference signal f(x) from the BB-OSC that configures the oscillation module 22. For convenience of description, an origin of the time of a signal output from the BB-OSC is shifted by half cycle, f(x) is expressed by the following Expression (1.3). $\Delta\omega$ is a one-sided modulation bandwidth.

[Ex. 2]

$$f(x) = \begin{cases} \dfrac{4\Delta\omega}{T_f}x + \Delta\omega: & -\dfrac{T_f}{2} \le x < 0 \\ -\dfrac{4\Delta\omega}{T_f}x + \Delta\omega: & 0 \le x < \dfrac{T_f}{2} \end{cases} \quad (1.3)$$

Here, it is assumed that M targets to be detected continuously move at a position of a relative distance $r^m$(m) in the line of sight with an angle $\theta^m$(deg) (time invariant) with respect to the radar apparatus 1 at a relative velocity $v^m$ (km/h) in the line of sight. As a result, echo signals $v^{TX1}{}_{Rx,n}(t)$ and $v^{TX2}{}_{Rx,n}(t)$ received by the respective receiving antennas may be represented by the following Expressions (1.4a) and (1.4b) with the use of the definitions of Expressions (1.5), (1.6a), and (1.6b) (n=1 to N, m=1 to M). The reception signals $v^{TX1}{}_{Rx,n}(t)$ represent the respective signals resulting from receiving the echo signals of the probe signals radiated from the transmitting antenna $A_{T1}$ by the receiving antennas $A_{R1}$ to $A_{RN}$ in the measurement time period [0, $T_f$]. The reception signals $v^{TX2}{}_{Rx,n}(t)$ represent the respective signals resulting from receiving the echo signals of the probe signals radiated from the transmitting antenna $A_{T2}$ by the receiving antennas $A_{R1}$ to $A_{RN}$ in the measurement time period [$T_f$, $2T_f$]. $n^{TX1}{}_n(t)$ and $n^{TX2}{}_n(t)$ are additive Gaussian noise.

[Ex. 3]

$$v^{TX1}_{RX,n}(t) = \sum_{m=1}^{M} \exp\{j[\omega_c(t - \tau^m(t)) + h(t - \tau^m(t)) + \phi_n^{TX1,m}]\} + n_n^{TX1}(t) \quad (1.4a)$$

$$v^{TX2}_{RX,n}(t) = \sum_{m=1}^{M} \exp\{j[\omega_c(t - \tau^m(t)) + h(t - \tau^m(t)) + \phi_n^{TX2,m}]\} + n_n^{TX2}(t) \quad (1.4b)$$

$$\tau^m(t) = \frac{2(r^m + v^m t)}{c} = \tau_0^m + \mu^m t,\; \mu^m = 2v^m/c \quad (1.5)$$

$$\phi_n^{TX1,m} = -\frac{2\pi}{\lambda}(n-1)d\sin(\theta^m) \quad (1.6a)$$

$$\phi_n^{TX2,m} = -\frac{2\pi}{\lambda}(N+n-2)d\sin(\theta^m) \quad (1.6b)$$

The respective reception signals are mixed with the system reference signals (output signals of the oscillation module 22) by the mixers 14 so as to be converted into baseband signals. The baseband signals are converted into digital signals at a sampling frequency of $\omega_s$ (for example, $\omega_s = K\omega_f$, $\omega_f = 2\pi/T_f$, K is the number of sampling) by the A/D converters 15. Subsequently, the signal processing unit 21 subjects those digital baseband signals (hereinafter, referred to as "demodulated signals") to the following signal processing to estimate the angles, distances and velocities of the targets to be detected.

In this example, the respective demodulated signals $v^{TX1}{}_{Rx,n}(t)$ and $v^{TX2}{}_{Rx,n}(t)$ obtained from the reception signals through the respective receiving antennas are represented by the following Expressions (1.7a) and (1.7b), when the phase errors accompanied by demodulation are treated as quantities derived from the respective probe signals and represented by $\Delta\psi^{TX1}(t)$ and $\Delta\psi^{TX2}(t)$ as a whole. It is assumed that a time variable t in the following notation of the respective signals moves a time discretized by $\delta t = T_f/K$. For example, in the $[0, T_f]$ time period, the time variable t moves $[0, \delta t, 2\delta t, \ldots, (K-1)\delta t]$.

[Ex. 4]

$$v_{RX,n}^{TX1}(t) = \qquad (1.7a)$$
$$\sum_{m=1}^{M} \exp\{j[\omega_c \tau^m(t) + h(t) - h(t - \tau^m(t)) + \phi_n^{TX1,m} + \Delta\psi^{TX1}(t)]\} + $$
$$n_n^{TX1}(t)$$

$$v_{RX,n}^{TX2}(t) = \qquad (1.7b)$$
$$\sum_{m=1}^{M} \exp\{j[\omega_c \tau^m(t) + h(t) - h(t - \tau^m(t)) + \phi_n^{TX2,m} + \Delta\psi^{TX2}(t)]\} + $$
$$n_n^{TX2}(t)$$

When phase terms caused by down-chirp of FM are extracted from the above-mentioned Expressions (1.7a) and (1.7b) in a state in which errors and spatial phases are excluded, based on various factors of the radar apparatus actually on the market, and are organized, the following Expression (1.8) is obtained. The various factors of the apparatus for reference is that a detectable range scale (the minimum detectable range and the maximum detectable range) is 1 to 200 (m), a detectable velocity scale is 1 (km/h) to 200 (km/h), $\Delta\omega$ is about 50 mega hertz (MHz), and the cycle $T_f$ of the reference signal (input signal to the RF-VCO) is 1 millisecond (msec).

[Ex. 5]

$$\omega_c \tau^m(t) + h(t) - h(t - \tau^m(t)) = \omega_c \tau^m(t) - \frac{4\Delta\omega}{T_m}\tau^m(t) \qquad (1.8)$$
$$\left(t - \frac{\tau^m(t)}{2}\right) + \Delta\omega\tau^m(t)$$
$$= \omega_c \mu^m t - \frac{4\Delta\omega}{T_f}\left(1 - \mu^m - \frac{\mu^m T_f}{4\tau_0^m}\right)$$
$$\tau_0^m t - \frac{4\Delta\omega}{T_f}\left(1 - \frac{\mu^m}{2}\right)\mu^m t^2 + $$
$$\omega_c \tau_0^m + \Delta\omega\tau_0^m\left(1 + \frac{2\tau_0^m}{T_f}\right)$$
$$\approx \omega_c \mu^m t - \frac{4\Delta\omega}{T_f}\tau_0^m t + \omega_c \tau_0^m + $$
$$\Delta\omega\tau_0^m$$

Referring to Expression (1.8), $-4\Delta\omega\tau_o^m/T_f$, which is a frequency component due to the distance delay (sign is different in the up-chirp of FM) is replaced with $\omega_B^m$, and a constant term $\omega_c\tau_o^m + \Delta\omega\tau_o^m$ is included in $\Delta\psi^{TX1}(t)$ and $\Delta\psi^{TX2}(t)$. As a result, Expression (1.7a) and Expression (1.7b) may be rewritten into the following Expressions (1.9a) and (1.9b).

[Ex. 6]

$$v_{RX,n}^{TX1}(t) = \sum_{m=1}^{M} \exp\{j[\omega_c \mu^m t + \omega_B^m t + \phi_n^{TX1,m} + \Delta\psi^{TX1}(t)]\} + n_n^{TX1}(t) \qquad (1.9a)$$

-continued $$v_{RX,n}^{TX2}(t) = \sum_{m=1}^{M} \exp\{j[\omega_c \mu^m t + \omega_B^m t + \phi_n^{TX2,m} + \Delta\psi^{TX2}(t)]\} + n_n^{TX2}(t) \qquad (1.9b)$$

A condition under which the aperture synthesis is established for the respective demodulated signals $v^{TX1}_{Rx,n}(t)$ and $v^{TX2}_{Rx,n}(t)$ acquired in the two measurement time slots $[0, T_f]$ and $[T_f, 2T_f]$ is that the phase lengths of the respective demodulated signals $v^{TX1}_{Rx,n}(t)$ and $v^{TX2}_{RX,1}(t)$ in the reference combination match each other in both the measurement time periods. Hence, in order to establish the aperture synthesis, treatment of the phase errors $\Delta\psi^{TX1}(t)$ and $\Delta\psi^{TX2}(t)$ expressed in the above-mentioned Expressions (1.9a) and (1.9b) becomes critical issue.

In the radar apparatus of FIG. 7, the aperture synthesizing operation is conducted in the signal processing unit 21. First, the signals obtained at the respective measurement time periods are subjected to Fourier transformation so as to be transformed into data of the frequency domain. This is described in detail below with an example of the demodulated signal $v^{TX1}_{Rx,n}(t)$. As a data element of a k-th ($k=-K/2+1$ to $K/2$) frequency index is given by the following Expression (1.10), the Fourier transformation result of the signal component corresponding to an m-th target may be represented by Expression (1.11a) except for the spatial phase. A left side of Expression (1.11a) is obtained by Expression (1.11c), for example, in the case where definition is made as in the following Expression (1.11b) $g_0^{TX1}=1$ may be given without losing generality.

[Ex. 7]

$$V_{RX,n}^{TX1}(k) = \frac{1}{T_f}\int_{-T_f/2}^{T_f/2} v_{RX,n}^{TX1}(t)\exp(-jk\omega_f t)dt \qquad (1.10)$$

$$\frac{1}{T_f}\int_{-T_f/2}^{T_f/2}\exp\{j[(\omega_c\mu^m + \omega_B^m - jk\omega_f)t + \Delta\psi^{TX1}(t)]\}dt = \qquad (1.11a)$$
$$X_k^m \exp[j\Delta\psi^{TX1}(k)]$$

$$\exp[j\Delta\psi^{TX1}(t)] = \sum_{u=0}^{\infty} g_u^{TX1} t^u \qquad (1.11b)$$

$$\sum_{u=0}^{\infty}\frac{1}{T_f}\int_{-T_f/2}^{T_f/2}\exp(j(\omega_c\mu^m + \omega_B^m - jk\omega_f)t)g_u t^u dt = \qquad (1.11c)$$
$$\frac{1}{T_f}\int_{-T_f/2}^{T_f/2}\exp[j(\omega_c\mu^m + \omega_B^m - jk\omega_f)t]dt + $$
$$\sum_{u=1}^{\infty}\frac{1}{T_f}\int_{-T_f/2}^{T_f/2}\exp[j(\omega_c\mu^m + \omega_B^m - jk\omega_f)t]g_u^{TX1} t^u dt = $$
$$X_k^m + \sum_{u=1}^{\infty} D_u^{TX1} = X_k^m\left(1 + \sum_{u=1}^{\infty}\frac{D_u^{TX1}}{X_k^m}\right)$$

Reflecting the consideration described above, the frequency domain signals converted from signals of the time domains expressed in the above-mentioned Expressions (1.9a) and (1.9b) may be represented by the following Expressions (1.12a) and (1.12b).

[Ex. 8]

$$V_{RX,n}^{TX1}(k) = \exp[j\Delta\psi^{TX1}(t)]\sum_{m=1}^{M}X_k^m\exp(j\phi_n^{TX1,m}) + N_n^{TX1}(k) \quad (1.12a)$$

$$V_{RX,n}^{TX2}(k) = \exp[j\Delta\psi^{TX2}(t)]\sum_{m=1}^{M}X_k^m\exp(j\phi_n^{TX2,m}) + N_n^{TX2}(k) \quad (1.12b)$$

Then, the signal processing unit 21 acquires a phase error $d\psi(k)$ in the respective frequency indexes k by using the respective demodulated signals corresponding to the reference combinations through the following Expression (1.13) (in this example, attention should be paid to a fact that the spatial phases are equal to each other for the reference combination).

Finally, the signal processing unit 21 multiplies the amount of compensation $\exp[-jd\psi(k)]$ based on the phase error $d\psi(k)$ by $V^{TX2}_{RX,n}(k)$ with respect to all of n and k, thereby conforming the phase error of $V^{TX2}_{RX,n}(k)$ to the phase error $\Delta\psi^{TX1}(t)$ of $V^{TX1}_{RX,n}(k)$, as a result of which the aperture synthesis is established. That is, the synthetic aperture signal obtained by the signal processing unit 21 in the radar apparatus of FIG. 7 is represented by the following Expressions (1.14a) and (1.14b) (for, simplification, influence of an additive noise component is omitted).

[Ex. 9]

$$d\psi(k) \equiv \arg[V_{RX,1}^{TX2}(k)] - \arg[V_{RX,N}^{TX1}(k)] \quad (1.13)$$
$$= \Delta\psi^{TX2}(k) - \Delta\psi^{TX1}(k)$$

$$V_{RX,n}^{TX1}(k) = \exp[j\Delta\psi^{TX1}(k)]\sum_{m=1}^{M}X_k^m\exp(j\phi_n^{TX1,m}) + N_n^{TX1}(k) \quad (1.14a)$$

$$V_{RX,n}^{TX2}(k) = \exp[j\Delta\psi^{TX1}(k)]\sum_{m=1}^{M}X_k^m\exp(j\phi_n^{TX2,m}) + N_n^{TX2}(k) \quad (1.14b)$$

In order to estimate an angle of the target to be detected from the respective signals represented by, for example, the above-mentioned Expressions (1.14a) and (1.14b), the signals of the reference receiving antennas after having being subjected to the aperture synthesis are defined by the following Expression (1.15) based on a fact that the spatial phases of the respective signals of the reference receiving antennas are equal to each other. Further, a vector V(k) having, as elements, the signals of the reference receiving antennas previously defined and the signals received by the other respective receiving antennas, a noise signal vector N(k), an angular matrix A, and a target signal vector X(k), are defined by the following Expressions (1.16a), (1.16b), (1.16c), and (1.16d), respectively, to thereby derive, for the aperture synthesized signal, a basic relational expression of array signal processing such as Expression (1.17) (needless to say, the respective expressions are notations related to the signal elements in which the frequency index is k).

[Ex. 10]

$$V_{RX,C}^{TX1/2}(k) = \frac{V_{RX,N}^{TX1}(k) + V_{RX,1}^{TX2}(k)}{2} \quad (1.15)$$

$$= \exp[j\Delta\psi^{TX1}(k)]\sum_{m=1}^{M}X_k^m\exp[j\phi_N^{TX1,m}] + N_C^{TX1/2}(k)$$

$$V(k) = \quad (1.16a)$$
$$\begin{bmatrix} V_{RX,1}^{TX1}(k) & \ldots & V_{RX,N-1}^{TX1}(k) & V_{RX,C}^{TX1/2}(k) & V_{RX,2}^{TX2}(k) & \ldots & V_{RX,N}^{TX2}(k) \end{bmatrix}^T$$

$$N(k) = \quad (1.16b)$$
$$\begin{bmatrix} N_{RX,1}^{TX1}(k) & \ldots & N_{N-1}^{TX1}(k) & N_C^{TX1/2}(k) & N_2^{TX2}(k) & \ldots & N_N^{TX2}(k) \end{bmatrix}^T$$

$$A = \begin{bmatrix} \exp(j\phi_1^{TX1,1}) & \ldots & \exp(j\phi_1^{TX1,M}) \\ \vdots & & \vdots \\ \exp(j\phi_{N-1}^{TX1,1}) & & \exp(j\phi_{N-1}^{TX1,M}) \\ \exp(j\phi_N^{TX1,1}) & & \exp(j\phi_N^{TX1,M}) \\ \exp(j\phi_2^{TX2,1}) & & \exp(j\phi_2^{TX2,M}) \\ \vdots & & \vdots \\ \exp(j\phi_N^{TX2,1}) & \ldots & \exp(j\phi_N^{TX2,M}) \end{bmatrix} \quad (1.16c)$$

$$X(k) = \begin{bmatrix} X_k^1 & \ldots & X_k^M \end{bmatrix}^T \quad (1.16d)$$

$$V(k) = \exp[j\Delta\psi^{TX1}(k)]AX(k) + N(k) \quad (1.17)$$

The signal processing unit 21 processes the signal vector defined by Expression (1.17) with the use of a known angle measurement algorithm such as DBF, MUSIC, or PRISM.

However, when a plurality of targets to be detected exist at the same distance and the respective targets to be detected move with a small velocity difference, in the operation of the radar apparatus different from that in the first embodiment, which is represented by the mathematical expressions as described above, such a problem that the targets to be detected may not be precisely detected is found.

Figure 9:
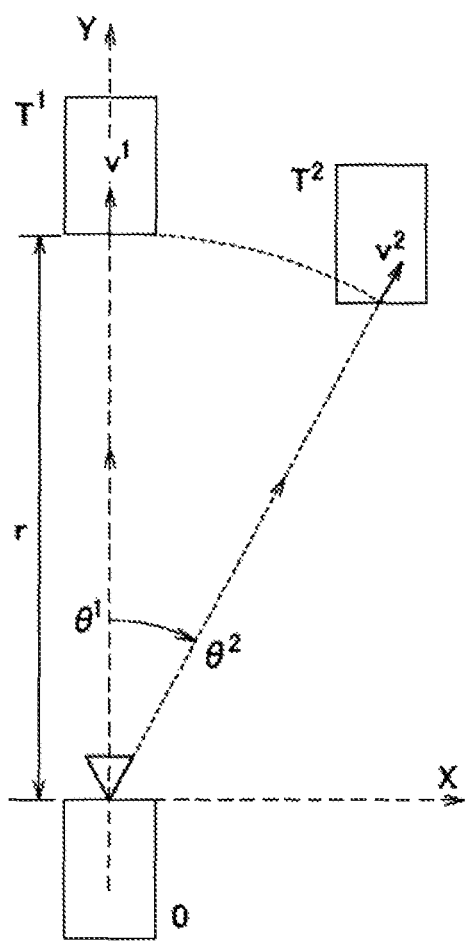
FIG. 9 is a diagram illustrating a scene setting example.

FIG. 9 is a diagram illustrating a scene setting example. In the following description, the problem on the radar apparatus illustrated in FIG. 7 is examined through mathematical expressions by using scene setting illustrated in FIG. 9. In the scene setting of FIG. 9, two targets to be detected $T^1$ and $T^2$ exist at the same distance ($r^1=r^2=r$) at angles of $\theta^1$ and $\theta^2$ from the radar apparatus O of FIG. 7, and move at the respective velocities $v^1$ and $v^2$.

When various factors of the radar apparatus used in calculation examples are mentioned, the system reference signal output from the oscillation module 22 is an FMCW signal having a carrier frequency of 76 gigahertz (GHz) ($=\omega_c/2\pi$), the basic cycle $T_f$ of the input signal (reference signal) to the RF-VCO of 4 (msec), and the one-sided modulation bandwidth of 50 (MHz) ($=\Delta\omega/2\pi$). Further, the number of antenna elements N is 4, an interval d between the antenna elements is 1.8λ (λ is a wavelength of the carrier signal), and the number of sampling K is 512. Further, it is assumed that various factors (distance, angle, and velocity) of the respective targets to be detected in the scene setting of FIG. 9 are $T^1$: (40 (m), 0 (deg), and 10 (km/h)) and $T^2$: (40 (m), 3 (deg), and 11 (km/h)), and SNR is 30 (dB). The various target factors may be slightly changed for each of the calculation examples.

Figure 10:
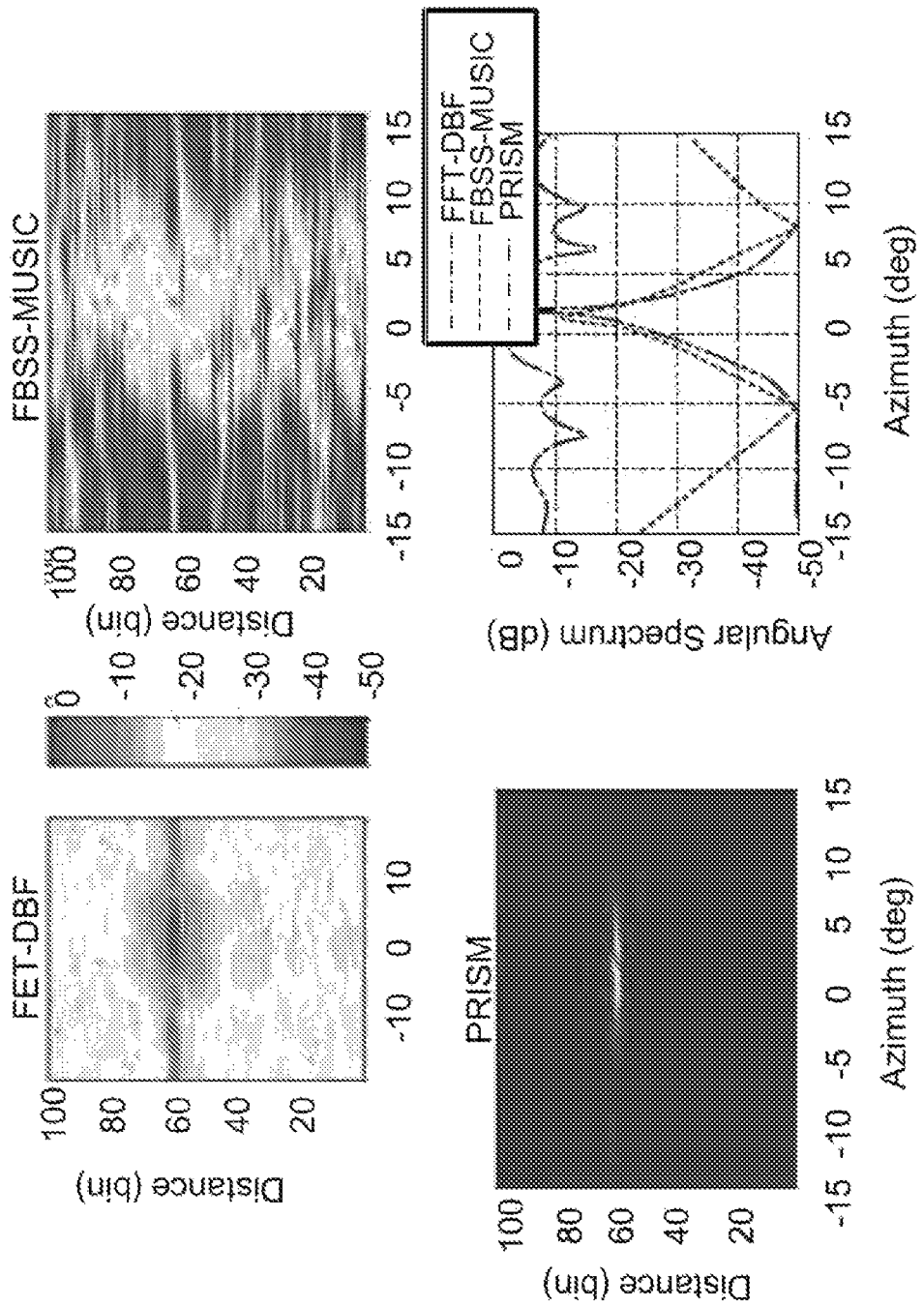
FIG. 10 is graphs illustrating results of implementing angle measurement by using the radar apparatus of FIG. 7.

In the radar apparatus illustrated in FIG. 7 different from that in the first embodiment, using the above-mentioned various factors, the aperture synthesizing operation is conducted according to the above-mentioned procedure, and an angle is measured by the frequency domain, to thereby obtain the results illustrated in FIG. 10.

FIG. 10 is graphs illustrating the angle measurement results in the radar apparatus illustrated in FIG. 7 different from that in the first embodiment. In FIG. 10, although the distances to the targets to be detected may be estimated substantially precisely, the respective targets to be detected which exist at 0 degrees and 3 degrees are erroneously estimated as one target to be detected which exists in the vicinity of about 1.5 degrees.

Figure 11:
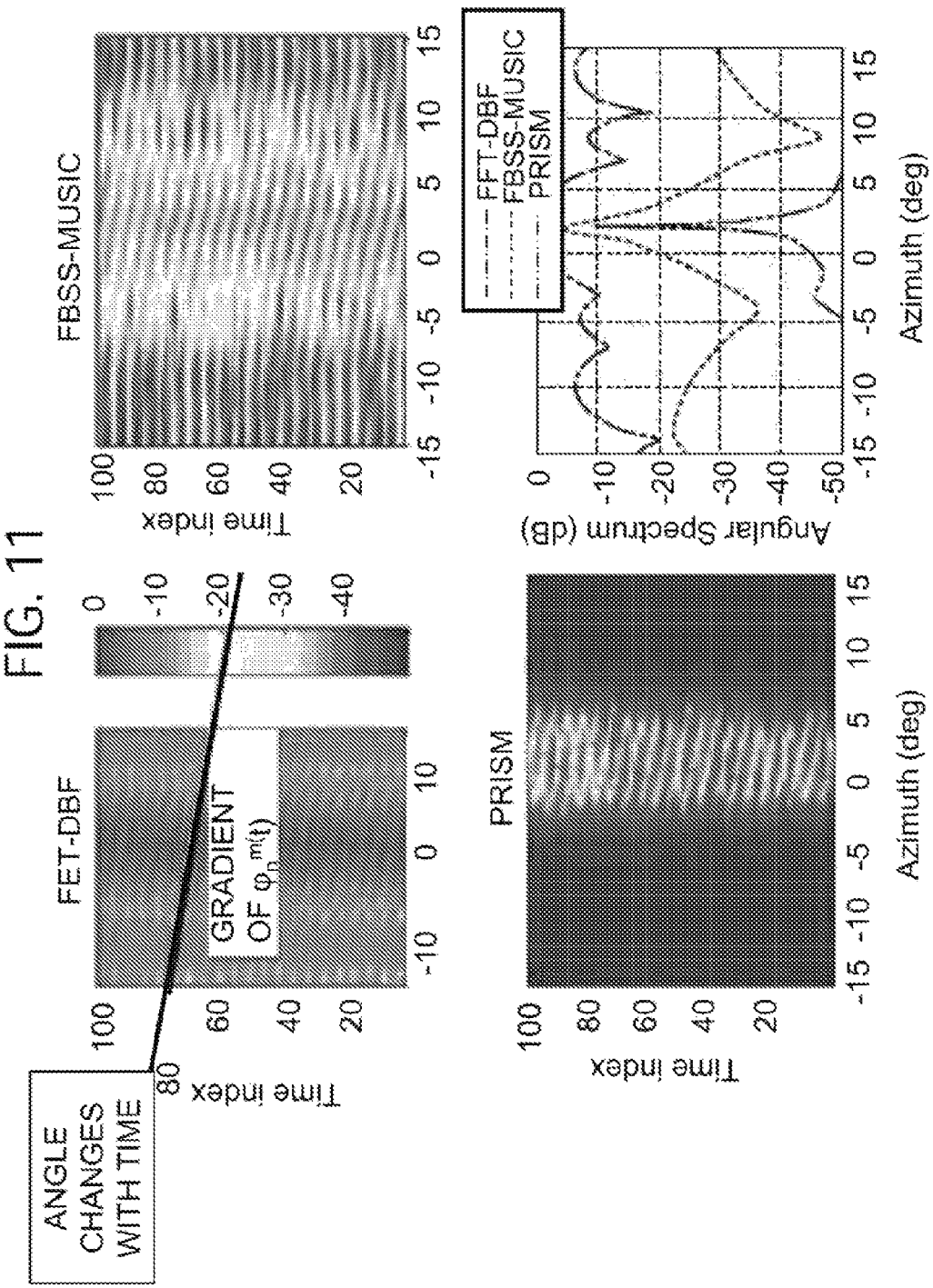
FIG. 11 is graphs illustrating results of implementing the angle measurement after converting a signal of a frequency domain used in FIG. 10 into a time domain signal.

Under the above-mentioned circumstances, in order to specify a cause of the above-mentioned erroneous estimation, the above-mentioned synthetic signal (Expression (1.17)) is subjected to inverse Fourier transformation, thereby again transforming the synthetic signal into a signal of the time domain. Thereafter, the angle measurement algorithm is applied to the signal of the time domain that has been again transformed. FIG. 11 is graphs illustrating the angle measurement results for the signal of the time domain, which has been transformed from the signal of the frequency domain used in FIG. 10. In the graphs illustrating the angle measurement results of DBF, MUSIC, and PRISM (an upper left graph, an upper right graph, and a lower left graph, respectively), a target angle which should be temporally fixed (in the drawing, referred to as "gradient of spatial phase $\phi'''_n(t)$") changes according to a time.

In this example, because a relative velocity difference between two targets to be detected is 1 (km/h) (≈0.28 (m/sec)), a distance difference between the targets to be measured, which is caused by the velocity difference for each $T_f$ (=4 (msec)) time, is just about 1.1 (mm), and the distance difference is a far smaller value than the distance resolution (≈0.75 (m)) of the device. In other words, through the two measurement time periods, because it is conceivable that the distances of the respective targets to be detected are the same, it may be considered that the frequencies $\omega_B^1$ and $\omega_B^2$ determined by the distance delay have the same value (Refer to Expression (2.1). More specifically, the frequencies $\omega_B^1$ and $\omega_B^2$ are about 13 (kHz) at 40 (m)). From the above viewpoint, the above-mentioned Expressions (1.9a) and (1.9b) may be rewritten into the following Expressions (2.2a) and (2.2b).

[Ex. 11]

$$\omega_B^1 \approx \omega_B^2 = \omega_B = -\frac{4\Delta\omega}{T_f}\tau_0^m = -\frac{8\Delta\omega r}{T_f c} \quad (2.1)$$

$$v_{RX,n}^{TX1}(t) = \quad (2.2a)$$

$$\exp\{j[\omega_B t + \Delta\psi^{TX1}(t)]\}\sum_{m=1}^{M}\exp[j(\omega_c\mu^m t + \phi_n^{TX1,m})] + n_n^{TX1}(t)$$

$$v_{RX,n}^{TX2}(t) = \quad (2.2b)$$

$$\exp\{j[\omega_B t + \Delta\psi^{TX2}(t)]\}\sum_{m=1}^{M}\exp[j(\omega_c\mu^m t + \phi_n^{TX2,m})] + n_n^{TX2}(t)$$

$$\omega_c\mu^m t + \phi_n^{TX1,m} = \frac{2\pi}{\lambda}[2v^m t - (n-1)d\sin(\theta^m)] \quad (2.3a)$$

$$\omega_c\mu^m t + \phi_n^{TX2,m} = \frac{2\pi}{\lambda}[2v^m t - (N+n-2)d\sin(\theta^m)] \quad (2.3b)$$

On the other hand, when a phase corresponding to the Doppler frequency and the spatial phase are considered, for example, a term in brackets of exp of a summation part of $v_{Rx,n}^{TX1}(t)$ in the above-mentioned Expression (2.2a) may be represented by the above-mentioned Expression (2.3a). According to this Expression (2.3a), it is found that a spatial phase $(2\pi/\lambda)(n-1)d\sin(\theta^m)$ which is temporally fixed is influenced by a Doppler phase shift $(2\pi/\lambda)2v^m t$ that varies with time, and exhibits temporally complicated behavior by combination of the velocities, times, and angles of the respective targets (Doppler frequency is about 1.4 (kHz) at 10 (km/h). As a result, as illustrated in FIG. 11, it is conceivable that a phenomenon that has been observed when the angle has been estimated in the time domain (angle that should be temporally fixed changes with time) occurs. Then, it is conceivable that the above-mentioned phenomenon leads to the above-mentioned problem (erroneous estimation illustrated in FIG. 10).

Under the above-mentioned circumstances, as a manner for solving the above problem, to cancel the phase difference of the signals in the time domain is first proposed. According to this manner, such a phenomenon including the influence of the Doppler phase shift that varies with time should be able to be compensated. More specifically, the amount of compensation is calculated by the following Expression (2.4) by using the above-mentioned Expression (2.2) for the reference combination. All of n and t of $v_{Rx,n}^{TX2}(t)$ are multiplied by $\exp[-jd\psi(t)]$ using the amount of compensation to conform the phase error of $v_{Rx,n}^{TX2}(t)$ to the phase error $\Delta\psi^{TX1}(t)$ common to the phase error of $v_{Rx,n}^{TX1}(t)$, and thereafter the synthesis aperture is conducted.

[Ex. 12]

$$d\psi(t) = \arg[v_{RX,1}^{TX2}(t)] - \arg[v_{RX,N}^{TX1}(t)] = \Delta\psi^{TX2}(t) - \Delta\psi^{TX1} \quad (2.4)$$

Figure 12:
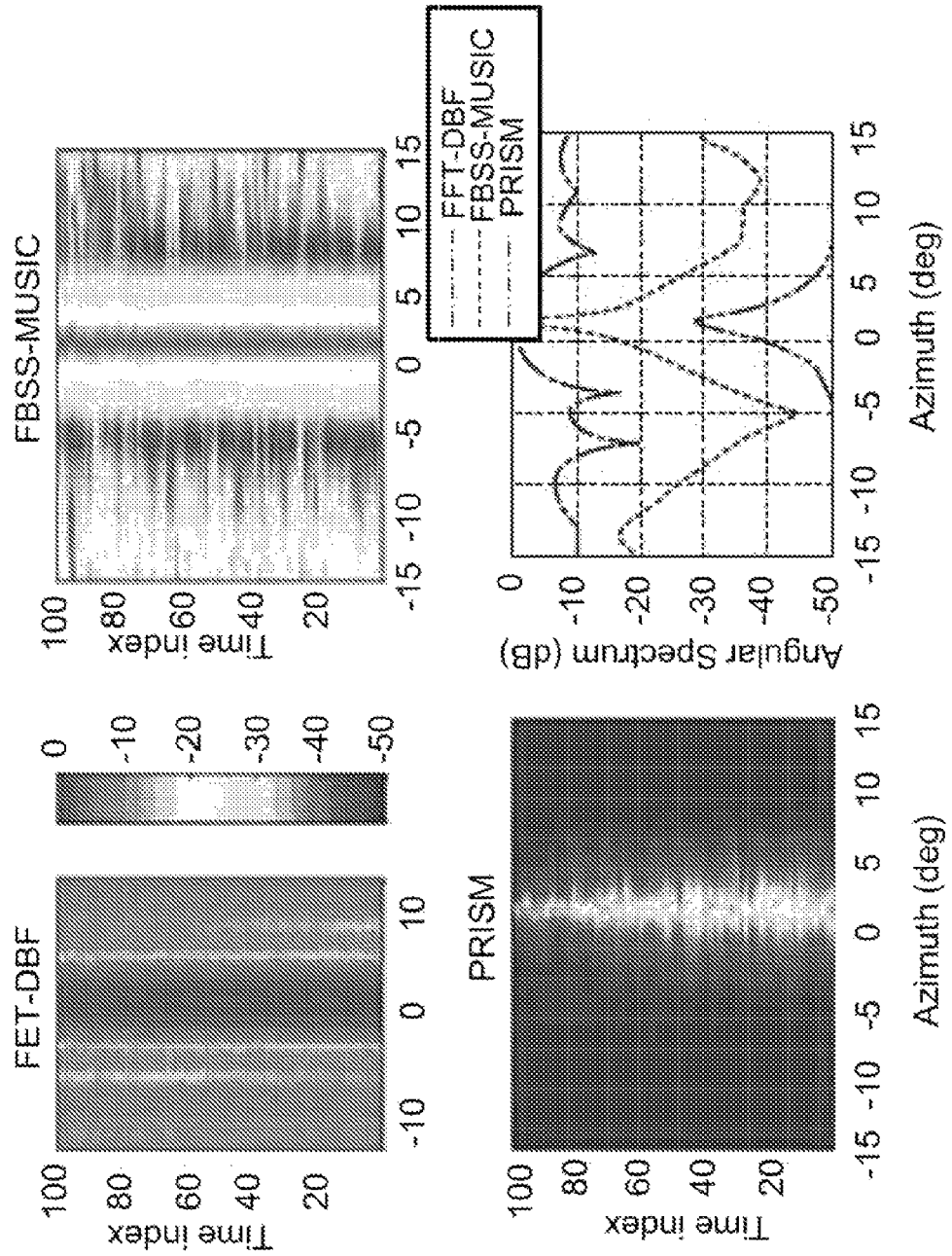
FIG. 12 is graphs illustrating angle measurement results when a phase difference is compensated in a time domain with respect to a signal of the time domain of FIG. 11.

FIG. 12 is graphs illustrating the results of applying the angle measurement algorithm to the signal thus obtained.

Referring to FIG. 12, the phase difference of the signal is cancelled in the time domain, to thereby cancel a change in angle with time as expected. However, the number and angles of targets to be detected remain erroneously estimated.

Under the above-mentioned circumstances, from a slightly different viewpoint, a manner for completely solving a problem on the aperture synthesis is proposed. That is, in the above-mentioned Expressions (2.2a) and (2.2b), the frequency determined according to the distance delay is about 13 (kHz) whereas the Doppler frequency is 1.4 (kHz), which is about 1/10. Therefore, attention is paid to a fact that the above-mentioned Expressions may be regarded as expressions in which the carrier signal, $\exp(j\omega_B t)$, is subjected to the amplitude modulation by time variant terms within the summation symbol. That is, in the above-mentioned Expression (2.2a), when only the summation part of $v_{Rx,n}^{TX1}(t)$ is extracted and organized, the following Expression (2.5) may be obtained.

[Ex. 13]

$$\sum_{m=1}^{M}\exp[j(\omega_c\mu^m t + \phi_n^{TX1,m})] = \quad (2.5)$$

$$\exp[j(\omega_c\mu^1 t + \phi_n^{TX1,1})] + \exp[j(\omega_c\mu^2 t + \phi_n^{TX1,2})] =$$

$$\exp\left[j\frac{(\omega_c\mu^2 t + \phi_n^{TX1,2}) + (\omega_c\mu^1 t + \phi_n^{TX1,1})}{2}\right]$$

$$2\cos\left[\frac{(\omega_c\mu^2 t + \phi_n^{TX1,2}) + (\omega_c\mu^1 t + \phi_n^{TX1,1})}{2}\right] =$$

$$\exp\left[j\frac{\omega_c(\mu^2 + \mu^1)t + (\phi_n^{TX1,1} + \phi_n^{TX1,2})}{2}\right]$$

$$2\cos\left[j\frac{\omega_c(\mu^2 + \mu^1)t + (\phi_n^{TX1,2} + \phi_n^{TX1,1})}{2}\right]$$

The rightmost side of the Expression (2.5) means that, as a result of synthesizing the signals from two targets, the synthesized signal substantially acts as one signal that may be represented by a product of a complex component exp( ) and a real number component cos( ). That is, the complex component may be interpreted as a signal from one target to be detected having an average Doppler frequency and an average angle of the two targets to be detected. Further, the real number component may be interpreted as a beat signal between Doppler signals of the two targets to be detected. Consequently, a signal resulting from subjecting a complex signal derived from the above-mentioned pseudo single target to the amplitude modulation (AM) by the above-mentioned beat signal is a substance of the above-mentioned Expression.

This is why the erroneous estimation of the number and angles of targets is not solved although the change in angle with time may be compensated by conducting the aperture synthesis from the phase compensation in the time domain. It is apparent that the beat signal (AM component) between the Doppler signals of the original targets to be detected is obtained as the envelope of Expression (2.5) (generally, Expression (1.9) and Expression (2.2)).

FIG. 13 is graphs illustrating together the demodulated signal in the reference receiving antenna and the envelope signal (AM component) obtained by subjecting the demodulated signal to the envelope detection, in order to examine the validity of the above-mentioned conclusions. The respective demodulated signals (Expression (2.2a) and (2.2b)) are illustrated on the upper portion, and the respective envelope signals are illustrated on the lower portion.

FIG. 13 illustrate that the phases of the reception signals obtained in the two measurement time periods $[0, T_f]$ and $[T_f, 2T_f]$ are largely different depending on an influence of the envelope. Further, the frequencies of the respective envelope signals (when being regarded as a bipolar signal) are about 73 (Hz), and far smaller than 500 (Hz) which is the minimum frequency resolution of the device. Therefore, it is apparent that the aperture may not be synthesized with precision even if the phase compensation is conducted in the frequency domain.

Under the above-mentioned circumstances, in the radar apparatus 1 according to the first embodiment, in order to avoid the influence of the envelope which collapses the above-mentioned aperture synthesis and deteriorates a detection precision, the envelope components of the demodulated signals of the signals received by the respective reference receiving antennas are detected (envelope detector unit 17). Subsequently, the cross correlation of the respective envelope components are taken to acquire a time lag in which the phases of the respective envelope components match each other (cross-correlation calculator 18). The cross-correlation processing by the cross-correlation calculator 18 is represented in the following Expression (3.1). Based on the acquired amount of delay, a signal portion in which the phases of the envelope components match each other is acquired from the respective reception signals (data clipper 19). Further, a residual phase error is compensated by the phase compensator (Because a compensation of the residual phase may be implemented in the frequency domain for data in which the phases of the envelopes match each other, an output signal from the data clipper may be converted into a signal of the frequency domain in the signal processing unit 21 to compensate the residual phase.), and the aperture synthesizing operation and the angle measurement algorithm are applied (signal processing unit 21).

[Ex. 14]

$$R_{RX,N/1}^{TX1/2,env}(\tau) = \frac{1}{2WT_f} \int_{-WT_f}^{WT_f} v_{RX,N}^{TX1,env}(t) v_{RX,1}^{TX2,env*}(t-\tau) dt, \quad (3.1)$$

$W = \max(P, Q)/2$

In this way, according to the first embodiment, based on the envelope information of the signals received by the respective reference receiving antennas $A_{RN}$ and $A_{R1}$ that receive the echo signals corresponding to the probe signals radiated from the respective reference transmitting antennas $A_{T1}$ and $A_{T2}$, the signal portion in which the phases match each other may be acquired so that the aperture synthesis is established in the respective measurement time periods ($[0, T_f]$ and $[T_f, 3T_f]$). As a result, the radar apparatus in which the number of effective receiving antennas is increased under an arbitrary condition, and a small number of actual antennas (sensors) are provided may be realized. That is, the angle estimation with high precision may be realized for the targets, the number of which is larger than the separable with number of the actual receive sensors.

Figure 14:
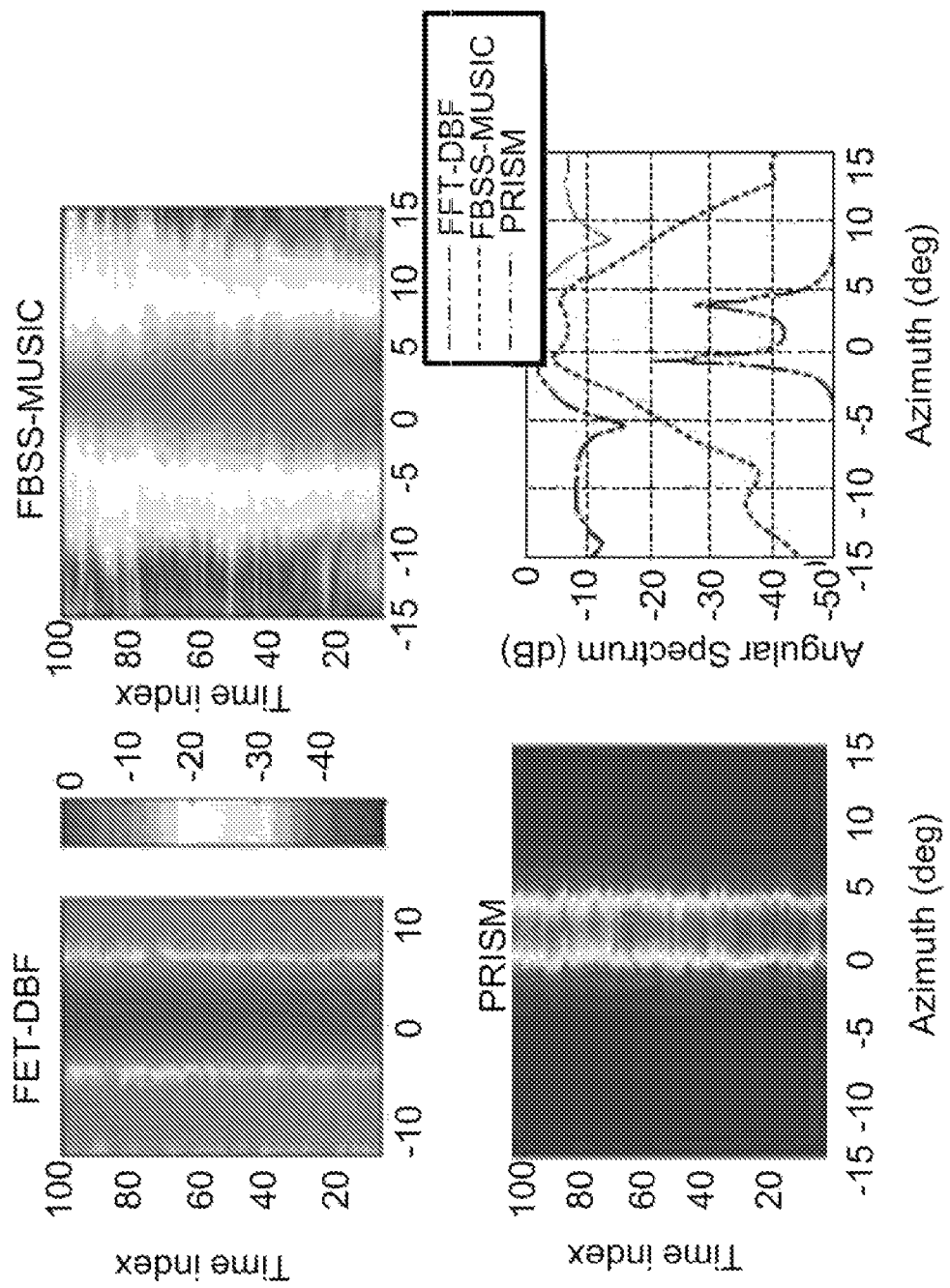
FIG. 14 is graphs illustrating results when an angle measurement algorithm is applied in the time domain by using the radar apparatus of the first embodiment.

FIG. 14 is graphs illustrating the results of applying the angle measurement algorithm in the time domain in the radar apparatus according to the first embodiment. For example, when PRISM is used as the angle measurement algorithm, the angles (0 degrees and 3 degrees) of the respective targets to be detected in the scene setting of FIG. 9 are precisely estimated.

Figure 15:
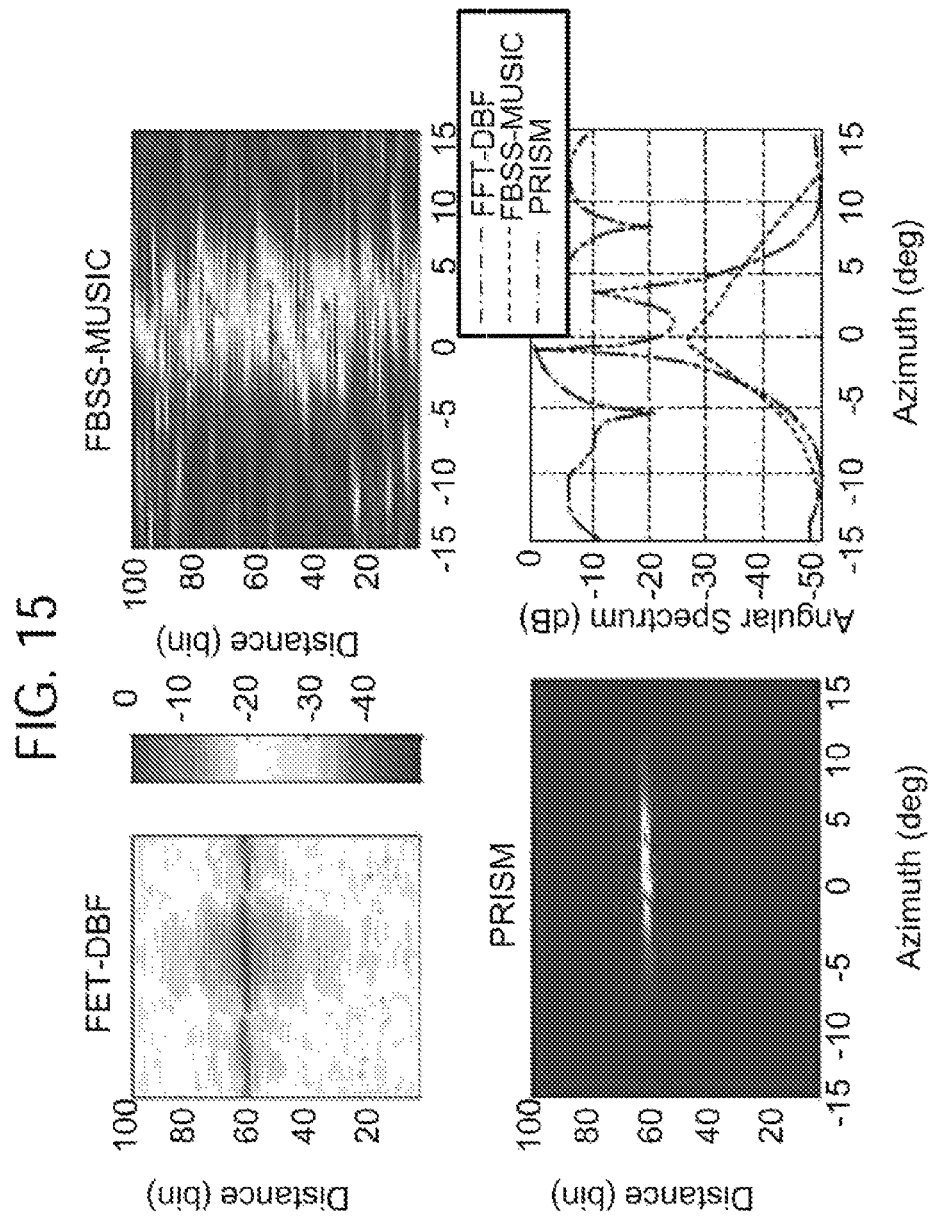
FIG. 15 is graphs illustrating results when an angle measurement algorithm is applied in the frequency domain by using the radar apparatus of the first embodiment.

FIG. 15 is graphs illustrating the results of applying the angle measurement algorithm in the frequency domain in the radar apparatus according to the first embodiment. In this case, the signal processing unit 21 transforms the aperture synthesized signal into the signals in the frequency domain by Fourier transformation, and applies the angle measurement algorithm to the transformed frequency domain signal. Similarly, in this case, the distances and angles of the respective targets to be detected in the scene setting of FIG. 9 are precisely estimated. As described above, if data in which the phases of the envelopes match each other are clipped by the data clipper 19, the phase compensation may thereafter be implemented by the frequency domain.

Therefore, according to the radar apparatus 1 of the first embodiment, even when a plurality of targets to be detected exist at the same distance and the respective targets to be detected move with a small velocity difference, the angles and distances (and also velocities) of the targets to be detected may be estimated with precision.

[Second Embodiment]

Hereinafter, a radar apparatus according to a second embodiment is described.

Figure 16:
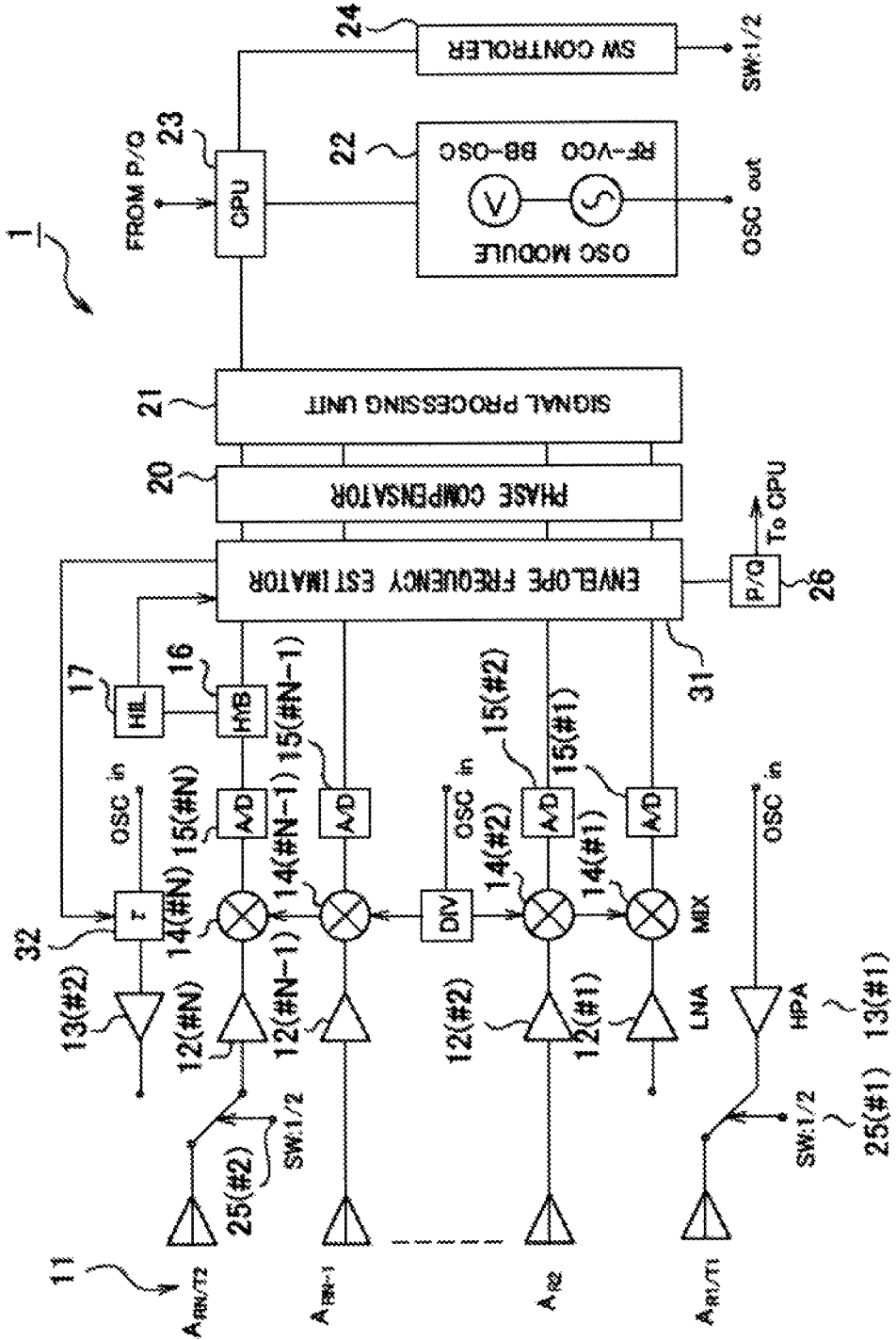
FIG. 16 is a block diagram illustrating a configuration of a radar apparatus 1 according to a second embodiment.

FIG. 16 is a block diagram illustrating a configuration of the radar apparatus 1 according to the second embodiment. Hereinafter, the respective processing units in the radar apparatus 1 of the second embodiment, which are different from those of the first embodiment, are described. The radar apparatus 1 according to the second embodiment has the HYB 16 and the envelope detector unit 17 only in a processing system corresponding to the receiving antenna $A_{RN}$ in one (combination of the transmitting antenna $A_{T1}$ and the receiving antenna $A_{RN}$) of the reference combinations. Further, the radar apparatus 1 according to the second embodiment has an envelope frequency estimator 31 (hereinafter, referred to as "EF estimator") 31 instead of the data clipper 19 of the first embodiment. Further, the radar apparatus 1 according to the second embodiment newly has a delay element 32 in a processing system corresponding to the transmitting antenna $A_{T2}$. The other processing units are the same as those in the first embodiment.

When receiving the envelope signal from the envelope detector unit 17, the EF estimator 31 estimates a frequency of the envelope signal (Because the envelope is normally composed of signal components having several frequencies, a frequency of the envelope synthesizing those signal components). The frequency to be estimated is calculated, for example, by using Expression (3.3) that is described later. Further, the EF estimator 31 calculates the time lag according to the estimated frequency information. The time lag is calculated, for example, by using Expression (3.4) that is described later.

Further, the EF estimator 31 may acquire information on the frequencies of the respective signal components that configure the envelopes. In this case, the EF estimator 31 may give an instruction to change the cycle $T_f$ of the reference signal from the transmission cycle setting unit 26 when the frequencies are smaller than a given threshold value.

The delay element 32 delays the system reference signal transmitted from the oscillation module 22 by the time lag calculated by the EF estimator 31. As a result, a radiation time of the probe signal from the transmitting antenna $A_{T2}$ is delayed by the time lag. The transmission may be stopped for a period of time corresponding to the time lag by a switch mechanism instead of the delay element 32 (For example, a control signal to the switch 25 (#2) may be transmitted to the switch controller 24 through a CPU.).

[Operation and Effects of the Second Embodiment]

Hereinafter, operation and effects of the radar apparatus 1 according to the second embodiment are described.

In this example, for simplification of description, when the summation part of the above-mentioned Expressions (2.2a) and (2.2b) are generalized under the condition where M is two or more, the following Expression (3.2) may be obtained. In the generalization, in order to avoid complication, the spatial phase terms are omitted.

[Ex. 15]

$$\sum_{m=1}^{M} \exp(j\omega_c\mu^m t) = \frac{2}{M-1} \sum_{m=1}^{M} \sum_{l=m+1}^{M} \exp\left[j\frac{\omega_c(\mu^m+\mu^l)t}{2}\right] \cos\left[j\frac{\omega_c(\mu^m-\mu^l)t}{2}\right] \quad (3.2)$$

It is found from this Expression (3.2) that, in order to succeed in the aperture synthesis, it is only necessary that the frequencies $\omega_c(\mu^m-\mu^l)/2$ of the signal components those configure the envelope of the signal received by the reference receiving antenna $A_{RN}$ be estimated in correspondence with the probe signal radiated from the transmitting antenna $A_{T1}$, and that the radiation of the probe signal from the transmitting antenna $A_{T2}$ be delayed by a period of time during which the phase of the envelope synthesized by using those frequency components are equal to each other. For example, when M=2, from the above-mentioned Expression (3.2), one signal component configuring the envelope is provided and a frequency $\omega_{env}$ thereof may be represented by the following Expression (3.3).

[Ex. 16]

$$\omega_{env} = \frac{\omega_c(\mu^2-\mu^1)}{2} = \frac{2\pi(v^2-v^1)}{\lambda} \quad (3.3)$$

Under the above-mentioned circumstances, when a timing at which the probe signal is radiated from the transmitting antenna $A_{T2}$ is delayed by $\Delta T$ time by the delay element 32, as represented by Expression (3.4), the phase of the envelope of the echo signal received by the reference receiving antenna $A_{RN}$ in correspondence with the probe signal radiated from the transmitting antenna $A_{T1}$ matches the phase of the envelope of the echo signal received by the reference receiving antenna $A_{R1}$ in correspondence with the probe signal radiated from the transmitting antenna $A_{T2}$, with a shift of integer times of $2\pi$. Accordingly, in the respective measurement time periods, the respective receiving antennas reception signals in which the envelopes match each other. In Expression (3.4), k is a natural number and a is a real number. Further, $v^1$ and $v^2$ represent the velocities of the targets to be detected $T_1$ and $T_2$, respectively.

[Ex. 17]

$$\omega_{env}\Delta T = \frac{2\pi(v^2-v^1)}{\lambda}\Delta T = 2\pi k \ (k \in Z) \Leftrightarrow \Delta T = \frac{2\pi k}{\omega_{env}}\left(=\frac{\lambda}{v^2-v^1}+aT_f\right) \quad (3.4)$$

In this way, according to the second embodiment, the radiation time of the probe signal from another transmitting antenna $A_{T2}$ is delayed by $\Delta T$ based on the time lag calculated from the frequency information of the envelope of the echo signal received by the reference receiving antenna $A_{RN}$ in correspondence with the probe signal radiated from the transmitting antenna $A_{T1}$. As a result, the phases of data in which the aperture synthesis is established in the respective measurement time periods ([0, $T_f$] and $\Delta T$+[0, $T_f$]) may be conformed to each other (A restriction when this embodiment is applied in the device disclosed in FIG. 16 is $\Delta T \geq T_f$. However, when a modulation system characterized by orthogonality such as code division multiplexing is applied to modulation of the probe signal, the present invention is not limited thereto.).

Figure 17:
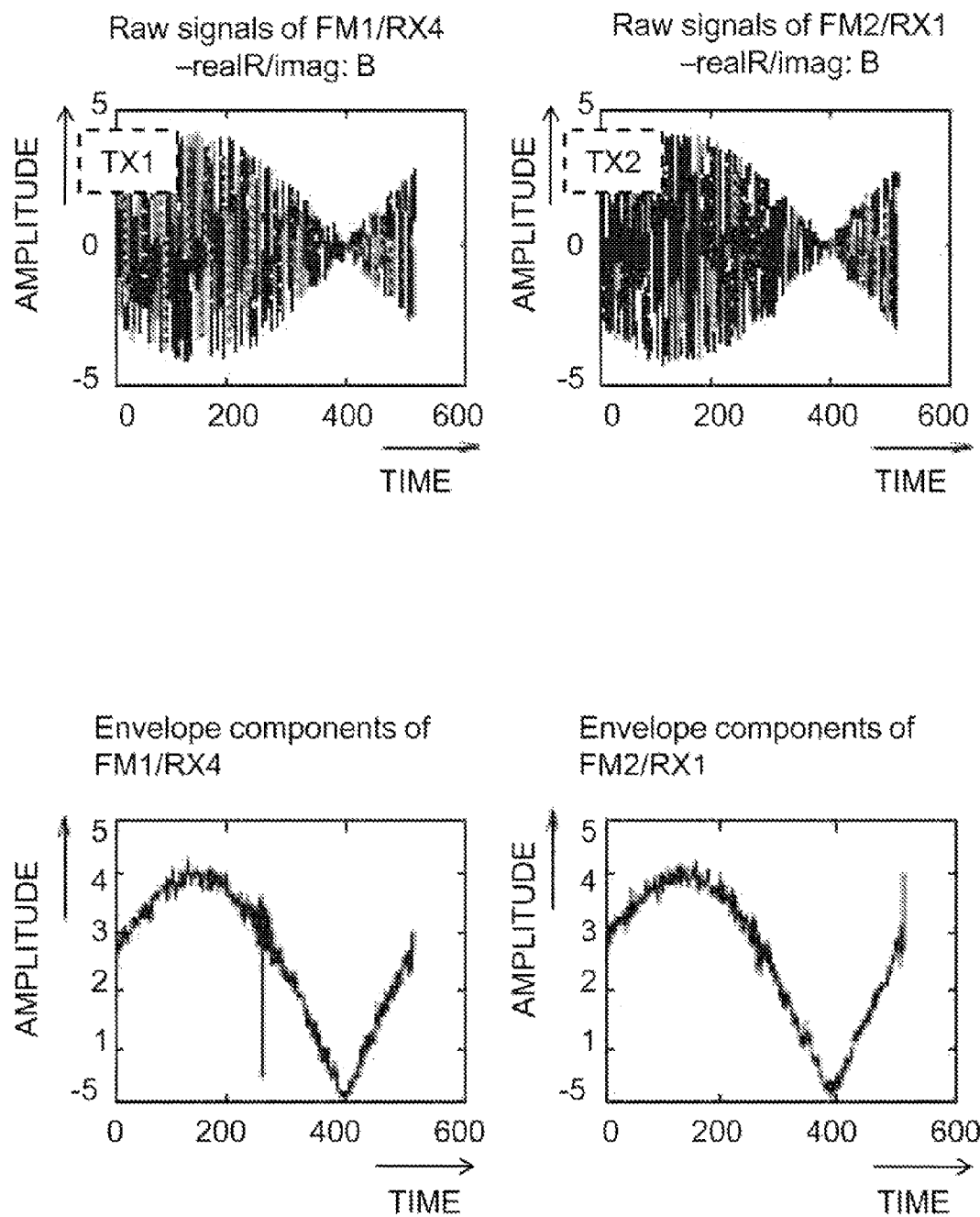
FIG. 17 is graphs illustrating results of phase compensation of an envelope component in the second embodiment.

FIG. 17 is graphs illustrating the results of phase compensation of the envelope components according to the second embodiment. In FIG. 17, a scene is used in which various factors (distance, angle, and velocity) of the targets to be detected are set to $T^1$ (40 m, 0 deg, and 10 km/h) and $T^2$, (40 m, 3 deg, and 12.0 km/h), and SNR is set to 30 (dB). Referring to FIG. 17, it is found that the phases of the envelope components of the respective demodulated signals corresponding to the signals received by the respective reference receiving antennas in correspondence with the probe signals radiated from both of the transmitting antennas match each other.

Figure 18:
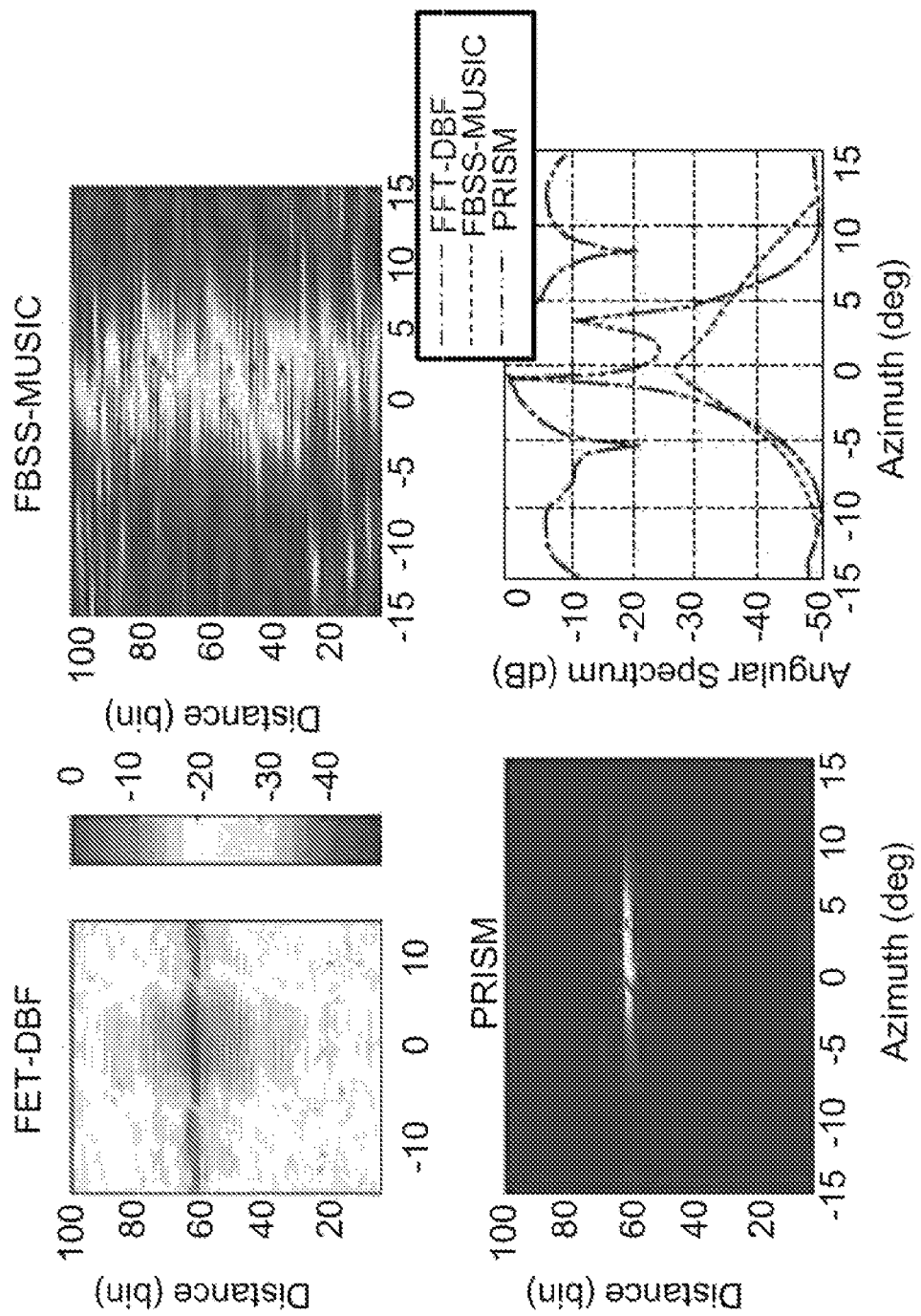
FIG. 18 is graphs illustrating results when an angle measurement algorithm is applied in the frequency domain by using the radar apparatus of the second embodiment.

FIG. 18 is graphs illustrating the results of applying the angle measurement algorithm in the frequency domain in the radar apparatus according to the second embodiment. In this case, the signal processing unit 21 transforms the aperture synthesized signal into the signals in the frequency domain by Fourier transformation, and applies the angle measurement algorithm to the transformed frequency domain signal (Alternatively, because the phase compensation of the envelopes of the respective reception signals has already been performed through radiating operation of probe signal from the respective transmitting antennas, for example, the reception signals obtained in the respective measurement time periods in the phase compensator 20 may be subjected to Fourier transformation, and the signals transformed in the frequency domain may be subjected to the residual phase compensation to the aperture synthesis, and in the signal processing unit 21, only processing such as the angle measurement algorithm may be conducted.). In this case, the distances and angles of the respective targets to be detected in the above-mentioned scene setting are also estimated with precision.

Therefore, according to the radar apparatus 1 of the second embodiment, the same effects as those in the first embodiment may be obtained.

In the device specifically disclosed in this embodiment, the number of effective antennas after aperture synthesis has been conducted is 2×N−1. When FBSS-MUSIC is considered as the angle measurement algorithm, the number of coherent signals, detectable by an array configured by the receiving antennas of this number is G[2×(2×N−1)/3] using the Gauss symbol G[ ]. As a result, when the number of targets to be detected M is larger than two, the EF estimator 31 estimates the frequency of the signal components, that configure the envelope obtained by the envelope detector units 17, as value making Expression (3.5) minimum. In Expression (3.5), the frequency of the signal components that configure the envelope components is defined as, for example, $\omega_{env} = [\omega^1_{env}, \ldots, \omega^L_{env}]^T$. Then, it is only necessary to obtain the time lag ΔT that establishes the above-mentioned Expression (3.4) for the frequency of the envelope modeled as a sum of a plurality of sine waves. HIL[$v^{TX1}_{RX,N}$(t)] in Expression (3.5) means that the echo signal received by the reference receiving antenna $A_{RN}$ corresponding to the probe signal radiated from the transmitting antenna $A_{T1}$ is subjected to the envelope detection.

[Ex. 18]

$$\varepsilon(\omega_{env}) = \min_{for\ \forall t} \left\{ \left| \sum_{l=1}^{L} \cos\omega^l_{env} t \right| - HIL[v^{TX1}_{RX,N}(t)] \right\}^2, \quad (3.5)$$

$$L = [2(2N-1)/3]$$

[Modified Example]

In the above-mentioned first and second embodiments, for simplification of description, an example in which two shared antennas (shared antennas $A_{R1/T1}$ and $A_{RN/T2}$) used for transmission are provided is described. However, this embodiment is not limited to this configuration. The number of shared antennas may be arbitrarily set. For example, when M (M>2) transmitting antennas are provided, the radar apparatus 1 according to the second embodiment may operate as follows. The radar apparatus 1 radiates the probe signals from at least any one transmitting antenna $A_{Tm}$ of the M transmitting antennas for only a regular period of time $QT_f$, subjects the echo signal obtained from the reference receiving antenna $A_{Rn}$ corresponding to $A_{Tm}$ to the envelope detection, and estimates the frequency $\omega_{env}$ of the envelope. Then, the radar apparatus 1 radiates the probe signal from, for example, the remaining (M−1) transmitting antennas with the time lag of $\Delta T = 2\pi k_1/\omega_{env}$ ($k_1 \in Z$, $1 \neq m$).

Figure 19:
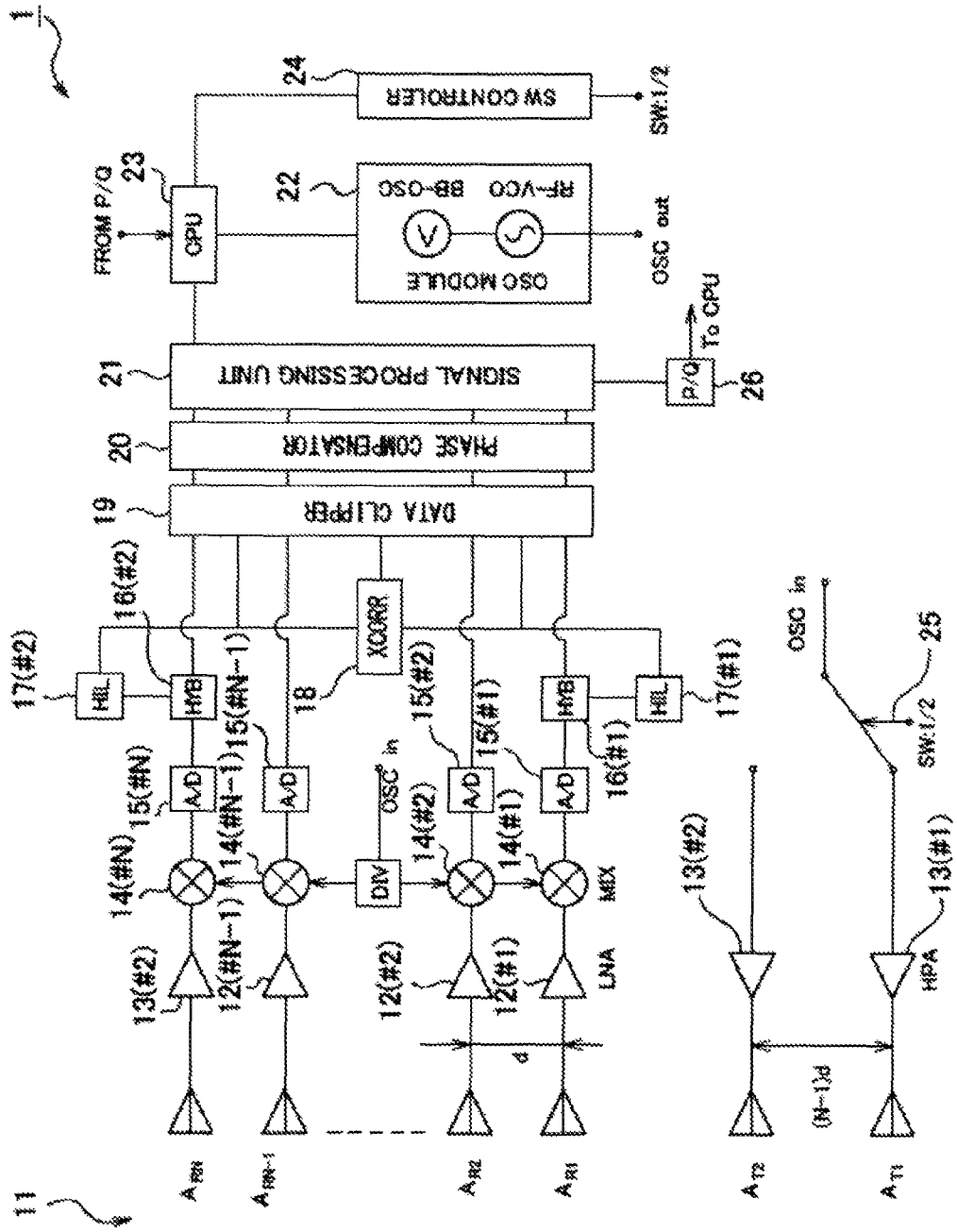
FIG. 19 is a diagram illustrating a modified example of the radar apparatus in the first embodiment.
Figure 20:
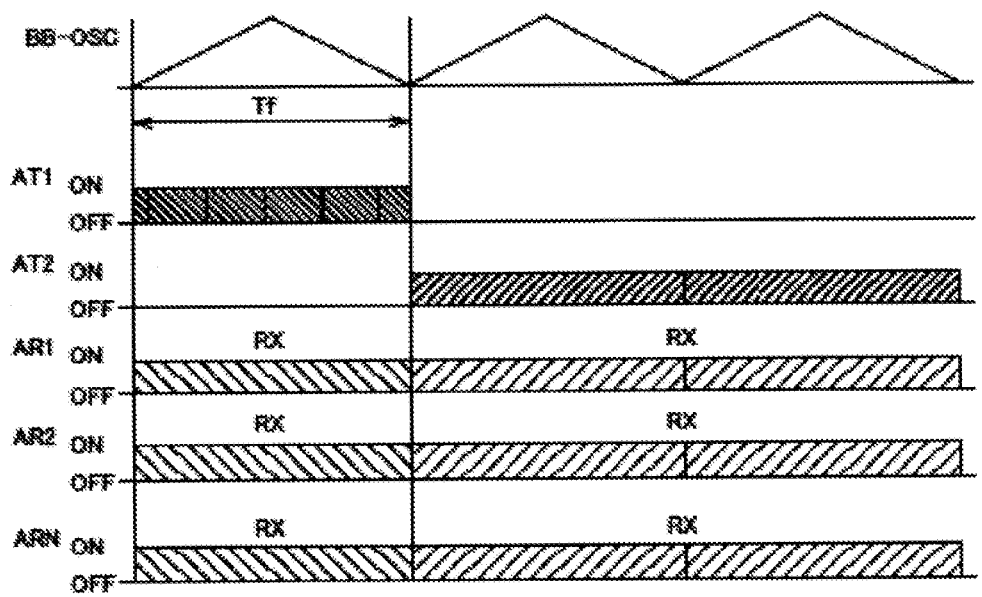
FIG. 20 is a timing chart in the modified example.

Further, instead of the configuration in which one antenna element is shared for transmission and reception, different antennas may be spatially arranged at different positions as illustrated in an example of FIG. 19. FIG. 19 is a diagram illustrating a modified example of the radar apparatus according to the first embodiment. The radar apparatus 1 according to the modified example includes the array antenna 11 having the receiving antennas $A_{R1}$ to $A_{RN}$ used only for reception and the transmitting antennas $A_{T1}$ to $A_{T2}$ used only for transmission. In this modified example, when intervals between the respective receiving antennas are set to d, intervals between the respective transmitting antennas are set to (N−1)×d. With this configuration, for example, the combination of the transmitting antenna $A_{T1}$ and the receiving antenna $A_{R1}$, and the combination of the transmitting antenna $A_{T2}$ and the receiving antenna $A_{RN}$ become the reference combinations. FIG. 19 illustrates the modified example of the first embodiment. However, this configuration may be applied to the second embodiment. FIG. 20 is a timing chart in the modified example.

Further, in this embodiment, the antenna (sensor) intervals are not limited to regular intervals. Further, when the frequency of the envelope is so high that the frequency may be detected by using Fourier transformation, the configuration of the radar apparatus 1 according to the first and second embodiments may be switched to the configuration illustrated in FIG. 7 (For example, in the device according to the first embodiment, this may be determined because peaks having substantially the same amplitude are obtained at the some different values of delay from the cross-correlation calculator 18. When the minimum time lag is applied as a necessary time lag among the plurality of peaks, there is no need to incorporate a configuration in which the signal is purposely switched to the frequency domain to conduct phase compensation therein.). Further, when the envelope frequency is smaller than a given threshold value, that is, when the cross correlation is substantially fixed, a linear approximation equation may be obtained by least squares method, and then the phase focusing of the envelope components may be conducted as the linear trend (In this case, because the demodulated signal is an original constant envelope of an FMCW radar, it goes without saying that the same operation as that of the above-mentioned notation may be conducted.).

Further, when the spatial phase and the phase due to the Doppler component are equal to each other, an operation mode may be switched. That is, for example, the sampling frequency is changed, irregular interval sampling is conducted, a value is used which is estimated by means such as a Kalman filter from values of various target factors obtained at a time point when the target to be detected has been normally detected, a measurement time period is shifted by a given time, or an angle is measured without conducting the aperture synthesis.

Further, the frequency $\omega_B$ determined according to the distance delay takes a relatively large value as described above. Therefore, if the frequency $\omega_B$ is detected by a filter bank or the like in advance and $v^{TX1/2}_{RX,n}(t)$ is multiplied by $\exp(-j\omega_B t)$ to demodulate the component of the following Expression (4.1), Expression (4.1) may be rewritten in an expression of the same form as Expression (1.17). In other words, the demodulated signal is treated as if the echo signal is configured by only the Doppler component, thereby enabling an angle estimating process. Instead of $v^{TX1/2}_{Rx,n}(t)$ being multiplied by $\exp(-j\omega_B t)$ all of $v^{TX1/2}_{Rx,n}(t)$ may be subjected to the envelope detection.

[Ex. 19]

$$\sum_{m=1}^{M} \exp[j(\omega_c \mu^m t + \phi^{TX1,m}_n)] = \quad (4.1)$$

$$\frac{2}{M-1} \sum_{m=1}^{M} \sum_{l=m+1}^{M} \exp\left[j\frac{\omega_c(\mu^l + \mu^m)t + (\phi^{TX1,l}_n + \phi^{TX1,m}_n)}{2}\right] \times$$

$$\cos\left[\frac{\omega_c(\mu^l + \mu^m)t + (\phi^{TX1,l}_n - \phi^{TX1,m}_n)}{2}\right]$$

The signal obtained by subjecting the respective signals to the envelope detection is |HIL($v^{TX1/2}_{RX,n}(t)$)|. Therefore, the angle of the target in which the angular spectrum indicates a peak is opposite in sign to a real value. In other words, the signal obtained by subjecting the respective signals to the envelope detection is close to demodulated signal of 100% amplitude-modulated signal. Therefore, angle estimation is conducted on an absolute value of the signal, or the aperture synthesis is realized by time diversity. When the baseband signal branched to an I/Q channel is obtained by a quadrature demodulator, there is no need to additionally provide an envelope detector unit, and the respective envelope components may be detected by taking the square root of a sum of the square of an I channel and the square of a Q channel.

Further, the reception signals from all of the receiving antennas including the receiving antennas that configure the reference combinations may be subjected to the envelope detection, and the angle measurement algorithm may be applied to the envelope signals per se of the respective receiving antennas obtained after the aperture synthesis has been conducted (As described above, this is substantially equivalent to a manner of dealing the demodulated signal as if the echo signal is configured by only the Doppler component. Therefore, in order to prevent sign of the angle measurement results from being inverted, it is desirable to transform the monopolarized envelope signal into a bipolar signal referring to the magnitude of the minimum phase shift.).

Further, when there are a plurality of targets having a velocity difference equal to or lower than a given velocity resolution, the following processing may be conducted. That is, the reception signals are branched for each of the receiving antennas in which one of the branched reception signals passes through a first low-pass filter (LPF) that cuts off frequencies equal to or higher than the velocity resolution, and the other of the branched reception signals passes through a second LPF or a band pass-filter (BPF) which allows frequencies equal to or higher than a cutoff frequency of the first LPF to pass therethrough. The signals that have passed the first LPF or the second LPF may be subjected to squared detection to determine whether or not the aperture synthesis is necessary, and whether or not the aperture synthesis is executed, may be selected according to the determination results.

[Supplement]

The frequency resolution and the distance resolution when data obtained by the radar apparatus having various factors ($T_f=1/250$ (sec), $\Delta\omega=50$ (MHz)) is subjected to Fourier transformation of 512 points are represented as follows ($\omega_+$ and $\omega_-$ are positive and negative frequencies having a minimum absolute value of 0 or more).

Minimum frequency (except for zero): $(\omega_+-\omega_-)/2\pi=250\times 2=500$ (Hz)

Maximum frequency: $500\times 512/2=128$ (kHz)

Minimum distance: $T_f C_0(\omega_+-\omega_-)/16\Delta\omega=0.75$ (m) ($C_0$ is a light velocity)

[Others]

<Component of Hardware and Component of Software>

A component of hardware is a hardware circuit which is, for example, a field programmable gate array (FPGA), an application-specific integrated circuit (ASIC), a gate array, a combination of logic gates, a signal processor circuit, and an analog circuit.

A component of software is a part (segment) that realizes the above-mentioned processing as software, but is not a concept that limits a language that realizes the software and a development environment. The component of software is, for example, a task, a process, a sled, a driver, firmware, a database, a table, a function, a procedure, a sub-routine, a given portion of a program code, a data structure, an array, a variable, and a parameter. Those components of software are realized, in a computer, on one or a plurality of memories, or realized by execution of data on one or a plurality of memories through one or a plurality of processors (for example, central processing unit (CPU) and digital signal processor (DSP)).

The above-mentioned respective embodiments do not limit a manner of realizing the above-mentioned respective processing units. The respective processing units may be configured by a manner realizable by a normally skilled person in this technical field as the above-mentioned component of hardware, the above-mentioned component of software, or a combination thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radar apparatus that detects a target by aperture synthesis of signals obtained from receiving antennas in an array antenna having a plurality of antenna elements, each of which is used as at least one of transmitting antennas and receiving antennas, comprising:
   an envelope detector unit that acquires an envelope component of a signal obtained from a receiving antenna in at least one combination of a plurality of combinations of transmitting antennas and receiving antennas whose spatial phases become equal to each other in the array antenna;
   a determination unit that determines a time lag of the envelope component acquired by the envelope detector unit as an amount of compensation in the at least one combination; and
   a compensator unit that compensates a phase of the signal obtained from each of the receiving antennas before synthesis by using the amount of compensation determined by the determination unit, or compensates a phase of a signal radiated from the transmitting antenna in another combination different from the at least one combination.

2. The radar apparatus according to claim 1, wherein:
   the envelope detector unit acquires the envelope component from each signal transmitted from each of the receiving antennas in each of the plurality of combinations;
   the determination unit takes a cross correlation of each envelope component acquired by the envelope detector unit to determine a time lag of the each envelope component as the amount of compensation; and
   the compensator unit compensates a phase of the envelope component of the each signal transmitted from the each of the receiving antennas by using the amount of compensation determined by the determination unit.

3. The radar apparatus according to claim 2, further comprising a control unit that sequentially switches signal radiation from each of the transmitting antennas in each transmit cycle time period corresponding to a cycle of a reference signal for a given modulation system, wherein:
   the envelope detector unit acquires an envelope signal from each signal in a time corresponding to the each transmit cycle time period, which is transmitted from the each of the receiving antennas in the each of the plurality of combinations;

the determination unit takes, after conforming a time length of each envelope signal acquired by the envelope detector unit to each other, the cross correlation of the each envelope signal to determine the time lag of the envelope component as the amount of compensation; and the compensator unit compensates the phase by extracting a signal of a minimum time period of the each transmit cycle time period from a timing delayed by the time lag determined by the determination unit in the each signal transmitted from the each of the receiving antennas.

4. The radar apparatus according to claim 3, wherein the determination unit changes at least one of the cycle of the reference signal and the each transmit cycle time period for the given modulation system when a peak value of the cross correlation of the each envelope component is lower than a given threshold value.

5. A radar apparatus that detects a target by aperture synthesis of signals obtained from receiving antennas in an array antenna having a plurality of antenna elements, each of which is used as at least one of transmitting antennas and receiving antennas, comprising:

an envelope detector unit that acquires an envelope component of a signal obtained from a receiving antenna in at least one combination of a plurality of combinations of transmitting antennas and receiving antennas whose spatial phases become equal to each other in the array antenna;

a determination unit that determines an amount of compensation in the at least one combination based on the envelope component acquired by the envelope detector unit; and a compensator unit that compensates a phase of the signal obtained from each of the receiving antennas before synthesis by using the amount of compensation determined by the determination unit, or compensates a phase of a signal radiated from the transmitting antenna in another combination different from the at least one combination, wherein:

the determination unit estimates a frequency of the envelope signal acquired by the envelope detector unit, and determines the amount of compensation in the at least one combination from the estimated frequency of the envelope signal; and the compensator unit delays the signal radiated from the transmitting antenna in the another combination by the amount of compensation determined by the determination unit.

6. The radar apparatus according to claim 5, wherein:
the number of the transmitting antennas is M;
the number of the receiving antennas is N; and
the determination unit estimates the frequency of the envelope signal by allowing use of the signal of $G[2 \times L/3]$ or lower with respect to L effective receiving antennas realized by subjecting the M transmitting antennas and the N receiving antennas to aperture synthesis, where $G[\ ]$ is Gauss symbol.

7. A method of detecting a target by aperture synthesis of signals obtained from receiving antennas in an array antenna having a plurality of antenna elements, each of which is used as at least one of transmitting antennas and receiving antennas, comprising:

acquiring, by using an envelope detector, an envelope component of a signal obtained from a receiving antenna in at least one combination of a plurality of combinations of transmitting antennas and receiving antennas whose spatial phases become equal to each other in the array antenna;

determining, by using a determiner, a time lag of the acquired envelope component as an amount of compensation in the at least one combination; and compensating, by using a compensator, a phase of the signal obtained from each of the receiving antennas before synthesis, or compensating a phase of a signal radiated from the transmitting antenna in another combination different from the at least one combination.

* * * * *